US010678457B2

(12) United States Patent
Jawahar et al.

(10) Patent No.: US 10,678,457 B2
(45) Date of Patent: Jun. 9, 2020

(54) ESTABLISHING AND MAINTAINING DATA APPORTIONING FOR AVAILABILITY DOMAIN FAULT TOLERANCE

(71) Applicant: Nutanix, Inc., San Jose, CA (US)

(72) Inventors: Anoop Jawahar, Bangalore (IN); Karan Gupta, San Jose, CA (US); Naveen Reddy Gundlagutta, Bangalore (IN)

(73) Assignee: Nutanix, Inc., San Jose, CA (US)

(*) Notice: Subject to any disclaimer, the term of this patent is extended or adjusted under 35 U.S.C. 154(b) by 127 days.

(21) Appl. No.: 15/818,660

(22) Filed: Nov. 20, 2017

(65) Prior Publication Data
US 2020/0026446 A1  Jan. 23, 2020

Related U.S. Application Data

(60) Provisional application No. 62/425,464, filed on Nov. 22, 2016.

(51) Int. Cl.
*G06F 12/00* (2006.01)
*G06F 3/06* (2006.01)
(Continued)

(52) U.S. Cl.
CPC .......... *G06F 3/0632* (2013.01); *G06F 3/0604* (2013.01); *G06F 3/065* (2013.01); *G06F 3/0683* (2013.01)

(58) Field of Classification Search
CPC ...... G06F 3/0632; G06F 3/0683; G06F 3/065; G06F 3/0604
See application file for complete search history.

(56) References Cited

U.S. PATENT DOCUMENTS 6,487,562 B1 * 11/2002 Mason, Jr. ............ G06F 3/0605
6,571,314 B1 * 5/2003 Komachiya ......... G06F 11/1076
711/114
(Continued)

OTHER PUBLICATIONS

Wikipedia, "Replication (computing)", Mar. 28, 2016, 8 pages.
(Continued)

*Primary Examiner* — Mark A Giardino, Jr.
(74) *Attorney, Agent, or Firm* — Vista IP Law Group, LLP

(57) ABSTRACT

Systems for distributed computing systems. A topological configuration of computing nodes is selected to manage availability of metadata data in a computing system. A method embodiment commences by accessing a plurality of node topology attributes and using those attributes to map between nodes and availability domains. Resource usage measurements such as computing node load are collected. A plurality of candidate replication configurations are generated, and each candidate replication configuration is scored with respect to several quantitative objectives. Additionally, the candidate replication configurations are given respective resource usage balance scores. One or more candidate replication configurations are selected based on resource usage balance scores and/or a separation skew value. Determination of a selected configuration is dominated by resource usage when there is a tie between best-scoring configurations or when none of the configurations meet a scoring threshold. Recalculation of configurations are triggered by an administrative command or by a topology change.

22 Claims, 12 Drawing Sheets

(51) Int. Cl.
*G06F 13/00* (2006.01)
*G06F 13/28* (2006.01)

(56) References Cited

U.S. PATENT DOCUMENTS

| | | | |
|---|---|---|---|
| 7,320,088 B1* | 1/2008 | Gawali | G06F 11/1662 709/219 |
| 7,738,466 B2 | 6/2010 | Schwan et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,966,027 B1* | 2/2015 | Brandwine | G06F 9/45533 709/221 |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,635,109 B2 | 4/2017 | Iliadis et al. | |
| 9,772,784 B2 | 9/2017 | Bhardwaj et al. | |
| 9,772,866 B1 | 9/2017 | Aron et al. | |
| 9,817,606 B1* | 11/2017 | Byrne | G06F 3/065 |
| 2003/0204509 A1* | 10/2003 | Dinker | H04L 41/0893 |
| 2004/0066741 A1 | 4/2004 | Dinker et al. | |
| 2005/0015641 A1* | 1/2005 | Alur | G06F 11/1458 714/2 |
| 2007/0006015 A1 | 1/2007 | Rao et al. | |
| 2007/0094343 A1* | 4/2007 | Sangle | H04L 67/1095 709/207 |
| 2007/0150558 A1 | 6/2007 | Teodosiu et al. | |
| 2007/0226224 A1 | 9/2007 | Wanigasekara-Mohotti et al. | |
| 2009/0077557 A1* | 3/2009 | Ichikawa | G06F 11/3461 718/102 |
| 2010/0036810 A1* | 2/2010 | Wu | G06F 11/3495 707/706 |
| 2011/0231450 A1 | 9/2011 | Sinha et al. | |
| 2013/0163471 A1 | 6/2013 | Indukuri et al. | |
| 2014/0075002 A1 | 3/2014 | Pradhan et al. | |
| 2016/0191391 A1 | 6/2016 | Wood et al. | |
| 2016/0232061 A1* | 8/2016 | Gaschler | G06F 16/27 |
| 2017/0013058 A1 | 1/2017 | Annamalai et al. | |
| 2017/0132089 A1* | 5/2017 | Roehrsheim | G06F 16/113 |
| 2017/0147227 A1 | 5/2017 | Stabrawa et al. | |
| 2017/0317780 A1 | 11/2017 | Wood et al. | |
| 2018/0121295 A1* | 5/2018 | Ramamurthi | G06F 11/1458 |

OTHER PUBLICATIONS

Featherston, D., "Cassandra: Principles and Application", University of Illinois at Urbana-Champaign, May 2010, 17 pages.

Lakshman et al., "Cassandra—A Decentralized Structured Storage System", Jan. 2008, 6 pages.

Ex-Parte Quayle Action dated Mar. 28, 2018 for related U.S. Appl. No. 15/230,147.

Notice of Allowance dated Aug. 3, 2018 for related U.S. Appl. No. 15/230,147.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Notice of Allowance dated Mar. 25, 2019 for related U.S. Appl. No. 15/230,147, 7 pages.

VPSA Object Storage: "Introduction" (Jun. 6, 2019), Zadara Guides, Version: 18.07, from http://guides.zadarastorage.com/zios-guide/1807/introduction.html.

Openstack: "The Rings" (Updated on Jun. 3, 2019), from https://docs.openstack.org/swift/latest/overview_ring.html.

Mills, A. "Algorithms for Optimal Replica Placement Under Correlated Failure in Hierarchical Failure Domains" (Apr. 21, 2017), The University of Texas at Dallas.

RBISWAS. "Rack Awareness—Hortonworks" (Jul. 2, 2016), from https://community.hortonworks.com/articles/43057/rack-awareness-1.html.

"Virtuozzo Storage: Administrator's Command Line Guide" (Apr. 24, 2019), https://docs.virtuozzo.com/pdf/virtuozzo_storage_administrators_command_line_guide.pdf.

Non-Final Office Action dated Jul. 8, 2019 for related U.S. Appl. No. 15/230,147.

Cano, I. et al., "Curator: Self-Managing Storage for Enterprise Clusters", *14th USENIX Symposium on Networked Systems Design and Implementation, NSDI '17* , (Mar. 27, 2017).

Final Office Action dated Nov. 20, 2019 for related U.S. Appl. No. 15/230,147.

* cited by examiner

ESTABLISHING AND MAINTAINING DATA APPORTIONING FOR AVAILABILITY DOMAIN FAULT TOLERANCE

RELATED APPLICATIONS

The present application claims the benefit of priority to U.S. Provisional Patent Application Ser. No. 62/425,464 titled, "ESTABLISHING AND MAINTAINING BLOCK FAULT TOLERANCE IN A RING", filed on Nov. 22, 2016, which is hereby incorporated by reference in its entirety.

FIELD

This disclosure relates to distributed computing system management, and more particularly to techniques for establishing and maintaining availability domain fault tolerance.

BACKGROUND

Modern distributed computing systems have evolved to include combinations of hardware and software so as to dynamically coordinate configurations of computing hardware, storage devices, networking hardware, and/or other distributed resources in such a way that incremental scaling can be accomplished in many dimensions. For example, a set of clusters in a distributed computing system might deploy hundreds of computing nodes (or more), any of which can support several thousand (or more) virtualized entities (VEs) such as virtual machines (VMs), containers, etc. that are individually tasked to perform one or more of a broad range of computing workloads. In many cases, several thousand VEs might be launched (e.g., in a swarm) to perform some set of tasks, then finish and collate their results, then self-terminate. As such, the working data, configuration (e.g., topology, resource distribution, etc.), and/or other characteristics of the distributed computing system can be highly dynamic as the workload fluctuates.

A system administrator might add or subtract nodes in a given cluster to scale or balance the resource capacity of the cluster. For example, scaling or balancing actions might include actions taken by a technician to physically install a hardware unit that comprises multiple nodes. The topology of such a cluster might describe a hardware partitioning such as a rack that can hold multiple (e.g., 42) such hardware units. The system administrator may also modify the physical and/or logical arrangement of the nodes based on then-current or forecasted resource usage. Such ongoing changes to the node topology raises certain events within the distributed computing system. Such events may in turn raise further events that invoke processes that re-evaluate the logical arrangement of the nodes and other distributed resources such as storage devices and/or the data or metadata stored on the storage devices.

In clustered computing environments such as heretofore described, distributed storage resources comprise aggregated physical storage facilities that form a logical storage pool throughout which data may be efficiently distributed according to various metrics and/or objectives. Metadata describing the storage pool and/or its data may be replicated any number of times across various hardware of the distributed computing system.

Users of these distributed systems have a data consistency expectation (e.g., "strictly consistent") that the computing platform provide consistent and predictable storage behavior (e.g., availability, accuracy, etc.) for metadata and corresponding underlying data. Accordingly, distributed computing platform providers can address such expectations by implementing data replication such that at least one copy of any stored item survives even in the event of certain hardware failures. For example, a given data replication policy might indicate that two replica copies of certain subject data (e.g., metadata, user data, etc.) may be distributed across available hardware in the cluster.

In some computing clusters, the hardware for managing the distributed data are mapped into a logical replication configuration (e.g., ring configuration). Determining which of many possible replication configurations would comply with a given data replication policy requirement to avoid a total loss of any particular item of data, while at the same time observing physical hardware partitioning constraints, and while at the same time observing the separation (e.g., skew) between hardware partitions can present challenges. Specifically, certain challenges arise when enumerating and/or evaluating replication configurations that satisfy the replication policies and are, at the same time, fault tolerant with respect to the hardware partitioning.

More specifically, in certain replication configurations, multiple copies of data are stored in several different locations (e.g., in or at storage devices of computing nodes). Given multiple copies that are stored at different locations, if a location becomes inaccessible (e.g., a computing node fails or its storage device fails), then the stored data at a different location can be accessed, thus the data is not lost entirely. Due to the nature of computing equipment, often, when one location fails for a particular reason (e.g., a motherboard hosting multiple computing nodes fails), then other locations (e.g., the multiple computing nodes that are hosted on the same motherboard) also fail for the same reason. A boundary around a set of certain hardware elements (e.g., nodes, motherboards, racks, etc.) constitutes an availability domain. One way to mitigate the possible loss of all copies of subject data is to configure the multiple locations into different availability domains, and to store the copies across those locations such that all of the multiple locations are unlikely to be lost by reason of a single availability domain failure.

A particular selection of locations constitutes a replication configuration. In replication configurations where all locations/occurrences of the subject data are lost upon failure of a single availability domain (e.g., failure of a single hardware block), that particular replication configuration is considered to be "availability domain unaware" or "hardware block unaware". However, a replication configuration that is "availability domain fault tolerant", "availability domain aware", or "hardware block aware" all refer to a configuration that retains at least one occurrence of the subject data even after a failure of any single availability domain.

Some replication configuration selection techniques might select the locations for distribution of subject data and its replication copies without considering the topology of availability domains with respect to a the hardware topology. In such cases, various availability domain failures can result in complete loss of all of the subject data. To avoid a complete loss of all of the subject data, certain techniques add more availability domains to a cluster (e.g., more hardware appliances, more nodes, more racks, more sites, more data centers, etc.) so as to reduce the likelihood of loss of all occurrences of the data, however this often imposes a significant (and possibly unnecessary) implementation expense.

Some techniques seek to reduce the likelihood of loss of all data by storing replicas in a ring topology, where data stored at one node of a ring is also stored at one or more neighboring nodes. This complicates determination of the desired availability domain aware configurations. For example, in a ring topology where copies of data are stored in neighboring nodes of the ring (e.g., either a clockwise neighbor or a counter-clockwise neighbor) maintenance of a domain aware configuration becomes more complicated as hardware elements are added (e.g., due to addition of new hardware in a manner that expands the size of the ring) and/or when hardware elements are removed (e.g., due to failure or decommissioning of a hardware element that contracts the size of the ring). Managing availability domain awareness under conditions of ring expansion or ring contraction, becomes even more complicated when additional constraints such as replication factor requirements and/or optimization objectives such as load balancing are considered. Specifically, when apportioning data to hardware elements of a ring, the data could be apportioned to a particular hardware element that is a neighbor in the ring when traversing in a clockwise direction around the ring, or it could apportioned to an alternate hardware element by traversing in a counter clockwise direction around the ring. Thus, there is a need to determine from among choices.

Unfortunately, all of the aforementioned techniques fail to consider load balancing and/or other costs or effects of data reapportionment when determining from among choices. This failure to consider the costs or load-balance effects of reapportionment leads to deployment of sub-optimal ring configurations. What is needed are techniques that avoid deployment of sub-optimal ring configurations that incur avoidable costs.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by their inclusion in this section.

SUMMARY

The present disclosure provides a detailed description of techniques used in systems, methods, and in computer program products for establishing and maintaining availability domain fault tolerance, while avoiding data reapportioning costs, which techniques advance the relevant technologies to address technological issues with legacy approaches. The disclosed embodiments modify and improve over legacy approaches. In particular, the herein-disclosed techniques provide technical solutions that address the technical problems attendant to selecting efficient fault tolerant replication configurations that are compliant with service level policies. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to hyperconverged computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
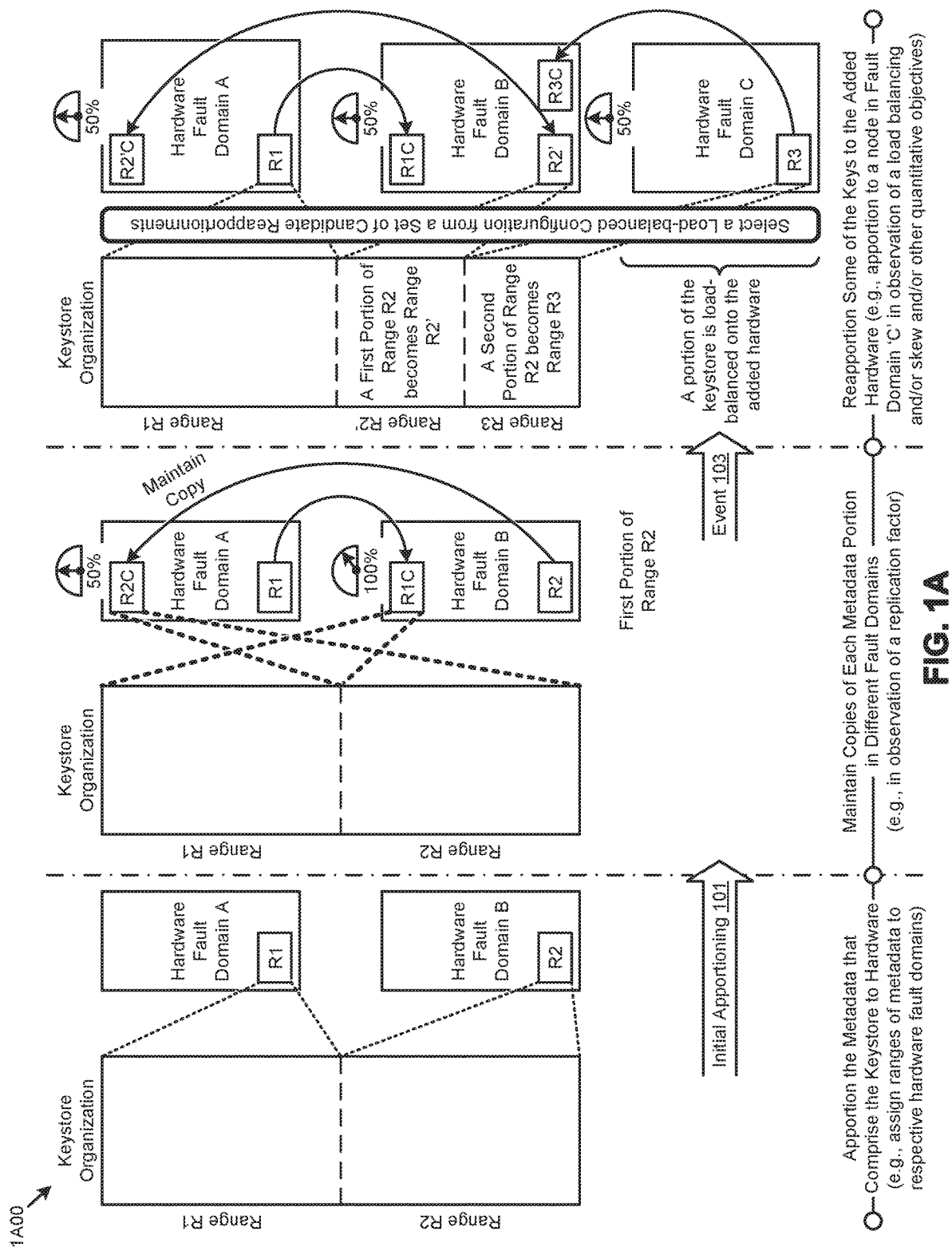
FIG. 1A presents a metadata reapportioning flow, including steps for block-aware metadata reapportioning after a hardware change event.

Embodiments in accordance with the present disclosure address the problem of selecting efficient fault tolerant replication configurations that are compliant with service level policies. Some embodiments are directed to approaches for implementing redistribution cost-aware selection techniques that select from a set of candidate availability domain aware replication configurations. The accompanying figures and discussions herein present example environments, systems, methods, and computer program products for establishing and maintaining availability domain fault tolerance in rapidly-changing computing environments.

Overview

Disclosed herein are techniques for implementing a cost-oriented selection technique to score and select metadata replication configurations in a manner that considers hardware fault/availability domain boundaries when forming candidate metadata replication configurations in a ring topology. The replication configurator accesses various attributes describing the ring topology and other hardware domain characteristics of the computing system. The topology attributes are then used to generate a set of candidate replication configurations (e.g., logical mappings of metadata portions and their respective copies onto computing nodes across different hardware fault domains) to facilitate managing certain replicated data (e.g., data, metadata, key-value pairs, etc.) across the distributed computing system.

A configuration score is computed for each candidate replication configuration to facilitate a quantitative comparison of the candidate replication configurations according to certain objectives. For example, such configuration scores might describe a quantitative relationship with an availability domain aware objective as well as a separation skew objective, and as well as a load-balancing and/or re-apportionment cost objective. The candidate replication configuration with the best performance in relation to the objectives (e.g., the highest configuration score) is selected for implementation. In certain embodiments, resource usage measurements are collected and/or resource usage balance scores computed for some or all of the candidate replication configurations to facilitate selection of a replication configuration that has a lower associated reapportionment cost. In certain embodiments, consideration of candidate topologies such as when additional hardware resources (e.g., additional computing nodes) are being added, candidate replication configurations are used to determine the availability domain or domains (e.g., racks, sites, etc.) into which the additional hardware resources are deployed.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

As used herein, an availability domain or fault domain is defined by a boundary around certain hardware elements of a computing system. Strictly as one example, a replication configuration might involve two availability domains, where one occurrence of subject data is stored in a device of a first availability domain that is powered by a first power source, and where another occurrence of the subject data is stored in a device of a second availability domain that is powered by a second power source. As such, even if a single one of the two power sources fail, there remains another accessible occurrence of the subject data. When generating replication configurations, one criteria used in selection of where to locate occurrences of subject data is to locate the occurrences in locations that are not likely to fail for the same reason. The granularity of an availability domain can be different for different clustered systems and/or topologies. Continuing the foregoing example, rather than referring to different power sources, an availability domain might refer to different motherboards, or to different drawers of a rack, or different racks, etc. The term availability domain and the term fault domain are used interchangeably. Moreover, a specific type or granularity of availability domain might refer to a hardware boundary in its name. As examples, a configuration might be termed "rack aware" when referring to an availability domain that is bounded by a rack, or a configuration might be termed "motherboard aware" when referring to an availability domain that is bounded by a motherboard, or a configuration might be termed "block aware" when referring to an availability domain that is bounded by any particular block of hardware.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A presents a metadata reapportioning flow 1A00, including steps for hardware block-aware metadata reapportioning after a hardware change event.

As shown, the metadata is organized into ranges. In this and other embodiments, the metadata comprises a keystore that is organized into a sorted order. As shown in the initial apportioning 101, the ranges are non-overlapping, mutually exclusive portions. In an initial state of an initial apportioning 101, a first range of keys (e.g., range R1) is apportioned to a first hardware block fault domain (e.g., hardware fault domain A). A second range of keys (e.g., range R2) is apportioned to a second hardware block fault domain (e.g., hardware fault domain B). For purposes of high availability (HA) of the information comprising the keystore organization, the ranges of the keystore are replicated to an adjacent hardware fault domain. More specifically, range R1 replication is accomplished by maintaining a copy (e.g., the shown copy R1C) of the keystore range R1 at a different node. As such the R1 range of keys is situated on two nodes, where each of which two nodes are situated in different hardware block fault domains. Similarly, range R2 replication is accomplished by maintaining one or more copies (e.g., the shown copy R2C) of the of the keystore range R2 at different node(s). As shown, the R2 range of keys is situated on two nodes, where each of which two nodes are situated in different hardware block fault domains. In many environments, two or more copies (e.g., three copies, five copies, etc.) are maintained on multiple nodes. If either/any of the multiple nodes goes down, there is a replicated copy available at another node that is located in a different fault domain (e.g., in a different hardware block).

At some moment in time (e.g., at event 103), hardware might be added, creating a new hardware fault domain. The newly-added hardware can share the task of maintaining the keystore and/or its replicas. To accomplish sharing the newly-added hardware (e.g., in a load balancing scenario), the shown availability domain aware metadata reapportioning technique is used. In the particular example shown, the former key range R2 is divided into load-balanced portions, with a first portion being named range R2' and apportioned to hardware fault domain B. The other portion is named range R3 and is apportioned to hardware fault domain C. Replicas of the new ranges (e.g., replica R2'C and replica R3C) are maintained at adjacent fault domains. Replicas from other ranges that might have been earlier maintained at a particular node can remain in their earlier-assigned position.

The depiction of FIG. 1A may appear to suggest an original-to-copy relationship or master-to-slave relationship between any of the data items, however, the depictions as shown in FIG. 1A are merely for illustrative purposes. In many of the embodiments described herein, there is no such relationship, rather, any particular occurrence of subject data is equivalent to any other occurrence of the same subject data, without any original-to-copy or master-to-slave relationship being shown or implied.

In some embodiments, the keystore holds data in the specific form of metadata (e.g., information about data), which metadata refers to underlying data that is stored in a storage pool of a computing cluster. By way of example, the keystore might hold metadata in the form of key/value pairs, where a key of the pair is a computerized identifier used to refer to a computing object of the cluster, and the value of the pair is a pointer or address that is used to access the location of the underlying data. As such, when a computing process seeks to access underlying data of a computing object, the computing process uses one or more aspects of the key portion of the pair (e.g., a hash value of the key) to determine a location (e.g., node address or node ID) of the key/value pair. Then, the key/value pair is retrieved from that node's keystore, and the value portion of the key/value pair is then used to access the sought-after underlying data. In some cases, the value portion of the key/value pair comprises another key. In other cases, the value portion of the key/value pair comprises an address in a storage pool, in other cases, the value portion of the key/value pair comprises an address in a directory or extent map, which in turn might refer to another address in another directory or in another extent map, and so on (e.g., in a recursive manner).

Further details regarding general approaches to managing directories and extent maps of a storage pool in a computing cluster are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining metadata in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

In the shown scenario, load balancing is implemented, at least to the extent that the load that was formerly handled by components of fault domain B can be henceforth apportioned to components of fault domain B as well as to components of fault domain C. Other reapportioning techniques are possible. Moreover, metadata reapportioning in more complicated hardware configurations and with various sets of metadata reapportioning constraints (e.g., policies) and objectives (e.g., scoring objectives) are possible. Some of such hardware configurations and techniques to select a particular keystore metadata replication configuration from a set of multiple keystore metadata replication configurations are shown and described in the replication configuration selection scenarios of FIG. 1B.

Figure 1B:
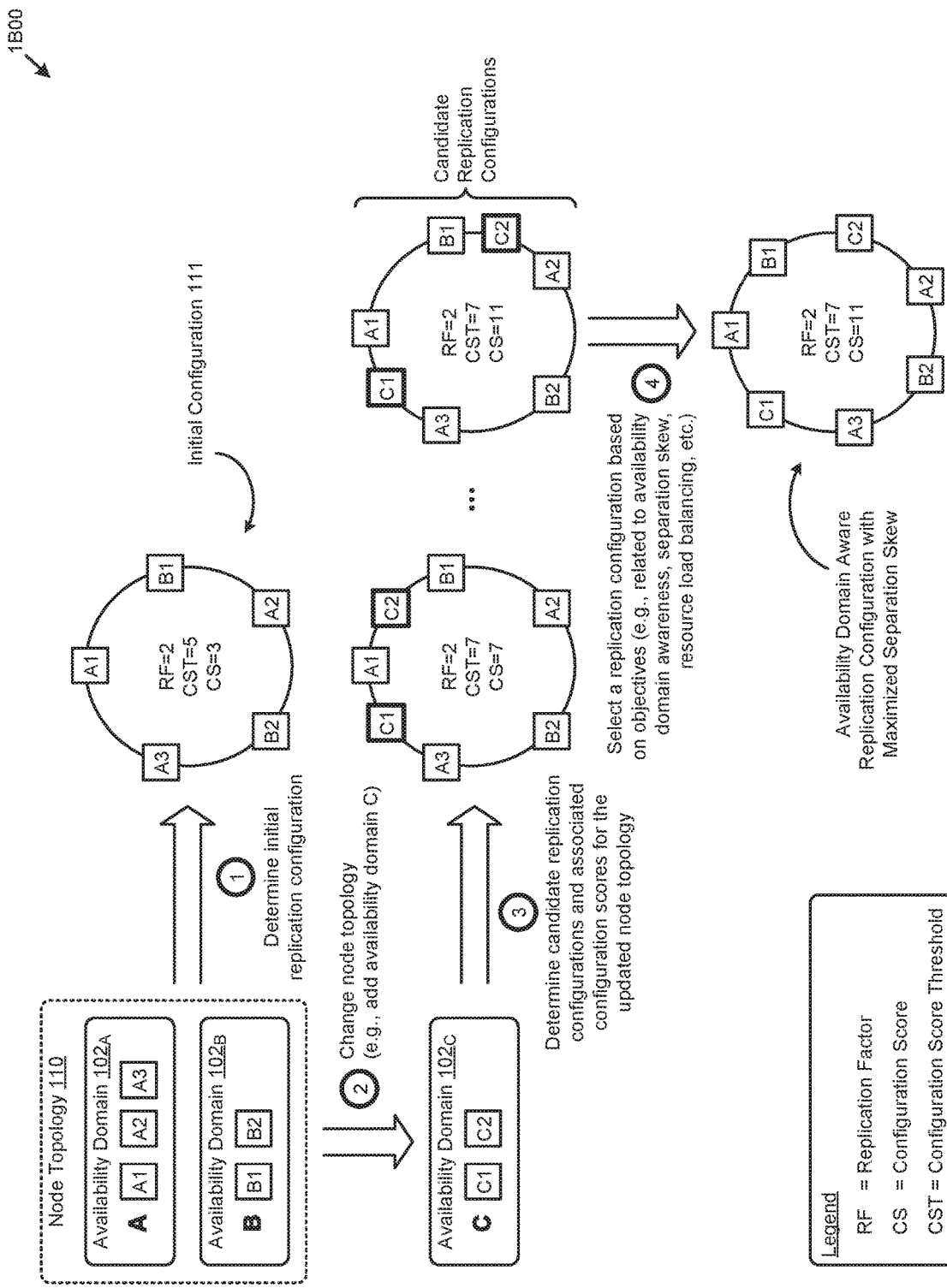
FIG. 1B presents a diagrammatic representation of a replication configuration selection scenario in a highly dynamic distributed computing environment, according to an embodiment.

FIG. 1B presents a diagrammatic representation of a replication configuration selection scenario 1B00 in a highly dynamic distributed computing environment. As an option, one or more variations of replication configuration selection scenario 1B00 or any aspect thereof may be implemented in the context of the architecture and functionality of the embodiments described herein. The replication configuration selection scenario 1B00 or any aspect thereof may be implemented in any environment.

A node topology 110 shown in FIG. 1B might comprise two availability domains (e.g., availability domain $102_A$ and availability domain $102_B$) in a highly dynamic distributed computing system. An availability domain (e.g., a fault domain), can be a set of hardware components (e.g., computers, switches, etc.) that share a single point of failure. As an example, an availability domain might be bounded by a physical server or a rack of servers. In some cases, the availability domain might be a portion of a server rack, where merely certain support components (e.g., redundant power supply unit, fans, etc.) are shared with other availability domains comprising the server rack. Node topology 110 further indicates various compute and/or storage nodes implemented in each availability domain. Specifically, node A1, node A2, and node A3 are in availability domain $102_A$, and node B1 and node B2 are in availability domain $102_B$.

A replication policy for the data (e.g., metadata, user data, etc.) pertaining to the nodes comprising node topology 110 might be initially implemented among the nodes using a replication configuration having the shown logical ring structure (operation 1). The shown ring structure represents the logical node relationships among the nodes in node topology 110. A replication service can use the ring-like replication configuration to implement the replication policy. As an example, such a ring structure might be used to implement an Apache Cassandra data replication framework. For a replication policy having a replication factor of two (e.g., RF=2), data replications for a subject node in the ring will be performed on the ring node that is one position (e.g., traversing clockwise) from the subject node. For example, data from node A1 will be replicated on node B1. In some cases, the direction, according to which direction the replicas are placed in the ring structure is based at least in part on an increasing token order. In some embodiments, one particular replication factor is applied to data, and a different replication factor is applied to metadata. In example cases, the replication factor applied to metadata is a relatively larger number (e.g., metadata RF=3 or metadata RF=5).

In some cases, a majority of the nodes (e.g., a quorum) identified to store a certain partition of replicated data are to agree on the consistency of the replicated data before the replication is committed. This ensures strict consistency for all stored data and/or metadata. A quorum number (e.g., QN) establishes a minimum number of replication copies that need to be available at a given moment in time, such as after a node and/or availability domain failure. For example, a replication factor of three (e.g., RF=3) corresponds to a quorum number of two (e.g., QN=2), such that in the event of a single availability domain failure, a rebuild can be performed from the quorum number of copies. As another example, if the replication factor is set at 5, then the quorum number is 3 and the system can tolerate a double failure and still have a quorum number copies available for rebuilding. On an ongoing basis, in order to maintain a quorum, any writes to any node that has a quorum number of copies that are distributed among other nodes is only deemed to be a successful write when all of the nodes of the quorum report success of their respective write operations.

As such, when the number of copies available after an availability domain failure is greater than or equal to the quorum number, the replication configuration is tagged or otherwise considered to be "availability domain aware". When the number of copies available after an availability domain failure is less than the quorum number, the replication configuration is tagged or otherwise considered to be "availability domain unaware". Of course, the arithmetic semantics pertaining to surpassing a threshold value (e.g., higher or lower) and/or corresponding comparison techniques (e.g., greater than or lower than) can be defined using any known comparison technique.

Other metrics can also provide quantitative measures of availability domain awareness objectives and/or other related objectives. As an example, a configuration score (CS) and configuration score threshold (CST) might be determined for a given replication configuration. The CS is the sum of all the node scores (NS) of each of the nodes in the replication configuration, which node scores measure the smallest distance (e.g., smallest number of intervening nodes in either direction) from a given node to the nearest node from the same availability domain. The configuration score might also be referred to as a block aware score or a rack aware score. Specifically, the CS can be defined as, $$CS = \Sigma NS_k \quad (EQ. 1)$$

where:
$NS_k$=node score of node k.
k=number of nodes in a given replication configuration.

In an availability domain-aware replication configuration, the node score for each of the nodes in the ring structure is equal to or greater than the replication factor minus one (e.g., $NS \geq RF-1$). A replication configuration can be determined to be availability domain aware when its configuration score is equal to or greater than the CST. Specifically, the CST can be defined as, $$CST = N \cdot (RF-1) \quad (EQ. 2)$$

where:
N=number of nodes, and
RF=replication factor.

As an example, consider EQ. 1 and EQ. 2 as they apply to the node topology 110 as shown in FIG. 1B. Further consider a replication configuration requirement that replicas of data are to be located in successive nodes of the ring without skipping nodes and without reversing direction when identifying successive nodes. As such, the initial ring configuration for node topology 110 shown in FIG. 1B has a CS of 3 and a CST of 5 such that this replication configuration is availability domain unaware (e.g., CS<CST). Strictly for illustration, a calculation of the CS value for the shown initial configuration 111 according to node topology 110 is given in Table 1.

TABLE 1

Calculation of configuration score CS for initial configuration 111

| Given Node Enumeration | Distance from the given node to another node from the same availability domain | Smallest distance from the given node to another node from the same availability domain | Running CS Score |
|---|---|---|---|
| A1-A2 | 1 | — | — |
| A1-A3 | 0 | 0 | 0 |
| A2-A1 | 1 | — | 0 |
| A2-A3 | 1 | 1 | 1 |
| A3-A1 | 0 | 0 | 1 |
| A3-A2 | 1 | — | 1 |
| B1-B2 | 1 | 1 | 2 |
| B2-B1 | 1 | 1 | 3 |

The value of CS provides a quantitative indication of the availability domain node separation or "separation skew" of a given replication configuration. Specifically, an increasing CS corresponds to an increasing sum of node scores which indicates an increasing separation of nodes from any one given availability domain to another availability domain. An increase in separation skew corresponds to the more preferred replication configurations since an increase in separation skew often reduces the number of changes (e.g., data moves) that would need to be applied to an 'old' replication configuration in order to bring into effect a 'new' replication configuration that had been selected in response to a node topology change. As earlier indicated, when a computing process seeks to access underlying data of a computing object through a keystore, the computing process uses one or more aspects of a key (e.g., a hash value of the key) to determine a location (e.g., node address or node ID) of the key/value pair. In some embodiments, such as is implemented in the specific ring structure used by the Apache Cassandra data replication framework, a node ID is determined using a hashing algorithm (e.g., the MD5 consistent hashing algorithm or variant). Further, as implemented in the specific ring structure as used by the Apache Cassandra data replication framework, replicas are located at the next successive node(s) of the ring. Assigning replicas to node locations in this manner leads to resiliency in the ring and ease of reapportioning, at least in that pointers or other data structures need not be maintained in order to locate a replica. Instead, merely an initial node location (e.g., as determined by a hashing algorithm), the value of the replication factor, and the constraint that replicas are assigned to successive nodes facilitate location of replicas in the ring without reliance on other data structures.

Reapportioning in a manner where there is more topological distance between nodes holding replicas results in a more desired configuration such that, in the face of prospective future topological changes, block-fault tolerance is more likely to be maintained even when nodes are added or removed from the cluster. As used herein, skew is a quantity that refers to a topological separation distance as measured by a number of nodes between a first node (e.g., where one occurrence is to be located) and a second node (e.g., where another occurrence is to be located) of a candidate replication configuration. As such, a skew quantity can be used in assessing separation distances of candidate replication configurations. Specifically, a higher skew value for a particular configuration can be achieved by reapportioning portions of metadata to nodes that are topologically farther apart.

As such, assigning reapportionments of metadata to nodes that are as topologically as far apart as possible offers the opportunity to maintain block fault tolerance even if some of the intervening nodes are removed from the cluster. Similarly, when adding new nodes to a cluster, there should be some separation skew between any two nodes that are being considered for metadata rebalancing. As can now be understood, with higher skew scores, block-fault tolerance of a configuration is more likely to be maintained even in the case of future events such as when nodes are added or removed from the cluster (e.g., due to additions of hardware, or due to decommissioning, or due to node failure, etc.).

In some cases, when performing comparisons between configuration scores and the aforementioned configuration score configuration score threshold, it can happen that none of the calculated configuration scores surpass the configuration score threshold, and thus none of those configurations (e.g., with low scores) are deemed as feasible candidates. In such situations, operations for selecting an acceptable replication configuration from the candidate replication configurations are based on the resource usage balance scores without considering the scores of configurations that do not surpass the threshold.

As further shown in FIG. 1B, certain system scaling operations might result in a change to node topology 110 (operation 2). Specifically, a third availability domain (e.g., availability domain 102c) comprising two nodes (e.g., node C1 and node C2) might be added to the distributed computing system. It is possible that as node topology changes occur, or even at the time of an initial replication configuration, multiple replication configurations are possible. As earlier mentioned, efficiently selecting of replication configurations that support compliance with replication policies in highly dynamic distributed computing systems (e.g., exhibiting frequent node topology changes) can present challenges. The replication configuration selection scenario 1B00 illustrates how the herein disclosed techniques address these challenges.

Responsive to some replication configuration event (e.g., initial replication configuration, node topology change, etc.), a set of candidate replication configurations and associated configuration scores can be determined (operation 3). As can be observed, two representative instances of such candidate replication configurations are shown, one having a configuration score of seven (e.g., CS=7), and another having a configuration score of 11 (e.g., CS=11). In operation 4, the candidate replication configurations are compared in an objective space defined by one or more objectives to select a configuration that is, or is nearest to, one or more of a set of optima in the objective space.

The aforementioned objectives might pertain to, for example, availability domain awareness, separation skew, resource load balancing, and/or other metrics. Both representative candidate replication configurations shown in FIG. 1B are availability domain aware (e.g., CS≥CST, 7≥7, and 11≥7) such that both the leftmost of the candidate replication configurations where CS≥CST (7≥7), and also the rightmost of the candidate replication configurations where CS≥CST (11≥7), might achieve an availability domain awareness objective, according to the quantifications of EQ.° 1 and EQ.° 2. In consideration of an additional objective, such as a separation skew objective, the candidate replication configuration with the highest CS (e.g., CS=11) will be selected to provide an availability domain-aware replication configuration with maximum separation skew.

Further details regarding general approaches to forming domain-aware replication configurations are described in U.S. application Ser. No. 15/230,147 titled "IMPLEMENTING AVAILABILITY DOMAIN AWARE REPLICATION POLICIES", filed on Aug. 5, 2016, which is hereby incorporated by reference in its entirety.

The foregoing calculations pertaining to forming domain-aware replication configuration are merely one example of a quantitative approach to determining a "goodness metric" or ranking of a particular configuration from a set of multiple configurations. Other quantitative approaches are possible. The goodness of a replication relates to placing (second or Nth) occurrences of subject data onto a node or nodes that would not fail for the same reason that a first node that hosts the subject data might fail. As such the determination of "goodness" of a configuration is determined by assignment of data occurrences to locations that are not likely to fail at the same time.

The notion of an availability domain derives from a desire to locate the occurrences of subject data to locations that are not likely to fail for the same reason. Thus, a failure, even total failure of one availability domain would not incur a total loss of any particular item of data, since there would be another occurrence of the particular item that is stored in a different availability domain. After a successful bring-up to a sufficient operational status of the failed availability domain hardware, that occurrence could be accessed so as to retrieve the subject data and copy it onto the successfully brought-up hardware, thus recovering from the temporary loss of the one availability domain. In addition to availability domain fault tolerance objectives, a configuration might be subjected to evaluation with respect to other objectives.

The calculations of EQ. 1 and EQ.2 are merely examples that define domain awareness using a threshold. Specifically, the calculations of EQ. 1 and EQ.2 quantify the objective to locate the occurrences of subject data to nodes that are not likely to fail for the same reason. Implied in the calculations of EQ. 1 (to quantify CS), EQ.2 (to quantify CST) and the inequality (that relates CS to CST) is a constraint that requires that no node hold any more than one occurrence of any subject data. In some embodiments, that constraint is relaxed. As such, other quantifications in the form of equations, and/or inequalities and/or heuristics can be used.

Figure 1C:
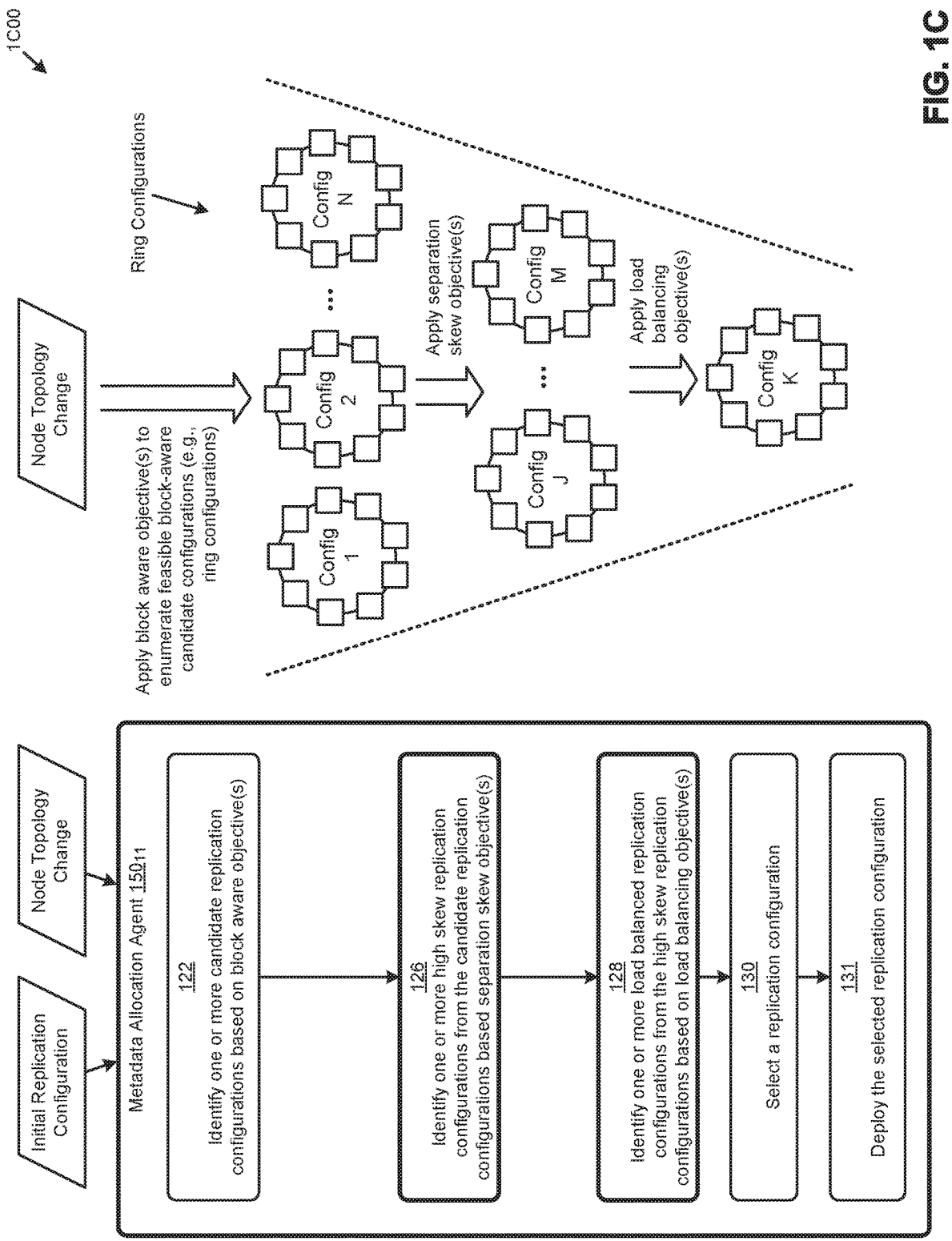
FIG. 1C presents a diagram of a multi-objective replication configuration selection technique as implemented in systems for establishing and maintaining availability domain fault tolerance in highly dynamic distributed computing environments, according to an embodiment.

As presented in FIG. 1C, the herein disclosed techniques can facilitate consideration of any number of objectives when establishing and maintaining availability domain fault tolerance in highly dynamic distributed computing environments.

FIG. 1C presents a diagram of a multi-objective replication configuration selection technique 1C00 as implemented in systems for establishing and maintaining availability domain fault tolerance in highly dynamic distributed computing environments. As an option, one or more variations of multi-objective replication configuration selection technique 1C00 or any aspect thereof may be implemented in the context of the architecture and functionality of the embodiments described herein. The multi-objective replication configuration selection technique 1C00 or any aspect thereof may be implemented in any environment.

The multi-objective replication configuration selection technique 1C00 presents one embodiment of certain steps and/or operations that implement the herein disclosed techniques for efficiently selecting a replication configuration based on multiple objectives. In the shown example, a first objective is identified as a block aware objective. A second objective is identified as a skew objective. A third objective is identified as a load balancing objective.

In one or more embodiments, the steps and underlying operations comprising the multi-objective replication configuration selection technique 1C00 can be executed by an instance of a metadata allocation agent $150_{11}$. Certain illustrations corresponding to the steps and/or operations comprising multi-objective replication configuration selection technique 1C00 are also shown for reference. The objectives described in the multi-objective replication configuration selection technique 1C00 are merely examples and other objectives are possible.

The multi-objective replication configuration selection technique 1C00 can commence with detecting certain replication configuration events (e.g., initial replication configuration, node topology change, etc.) at the metadata allocation agent $150_{11}$ to trigger an identification of one or more candidate replication configurations (e.g., the shown ring configurations) based on certain block aware objectives (step 122). As can be observed, multiple replication ring configurations (e.g., config 1, config 2, . . . , config N) might be identified as responsive to applying the block aware objectives. If no further objectives are to be considered, then a replication configuration can be selected from the identified candidate replication configurations. For example, the replication configuration might be selected based on a comparison of the candidate replication configurations in an objective space defined solely by the block aware objectives.

However, if another objective such as a skew objective is to be considered, then one or more high skew replication configurations from the candidate replication configurations are identified. The high skew replication configurations can be scored, for example, based on certain separation skew objectives (step 126). As shown, a subset of the earlier described candidate replication configurations might be identified as responsive to applying the separation skew objectives (e.g., the shown config J, . . . , the shown config M). If no further objectives are to be considered, then one (e.g., the shown config K) of the high skew replication configurations can be selected. The replication configuration might be selected based on a comparison of the high skew replication configurations in an objective space defined by the separation skew objectives, or in an objective space defined by a combination of the separation skew objectives and the block aware objectives.

However, if another objective such as load balancing is to be considered, then one or more load balanced replication configurations taken from the high skew replication configurations are identified, for example, based on certain resource load balancing objectives (step 128). A selected configuration is then selected (step 130) based at least in part on any combination of the aforementioned objectives (e.g., block aware objectives, and/or separation skew objectives, and/or load balancing objectives, and/or other objectives). At step 131, the selected replication configuration is deployed.

Figure 1D:
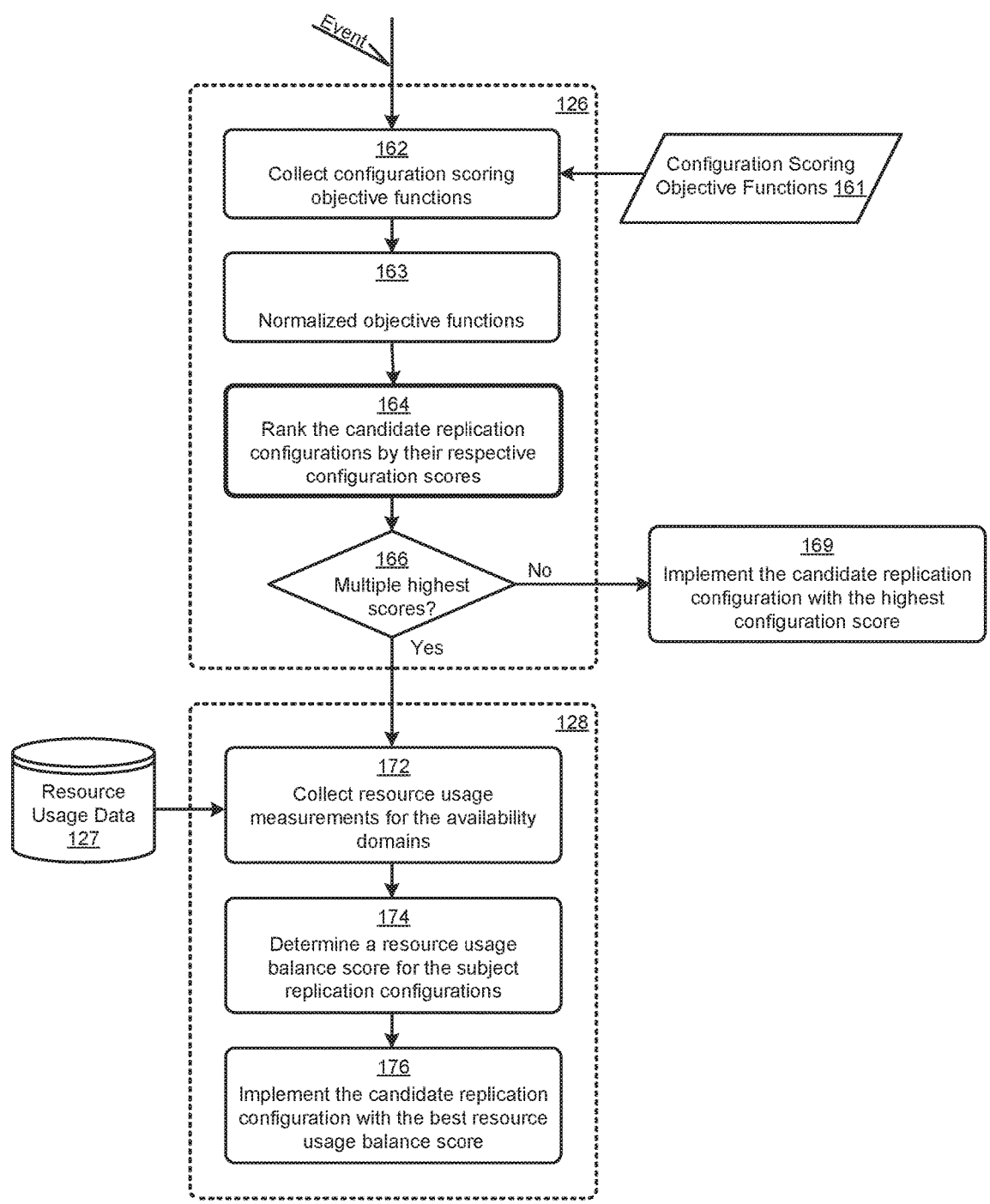
FIG. 1D illustrates a replication configuration selection technique as implemented in systems for establishing and maintaining availability domain fault tolerance in highly dynamic distributed computing environments, according to an embodiment.

One embodiment that implements the herein disclosed techniques for selecting replication configurations according to multiple objectives is shown and described as pertaining to FIG. 1D.

FIG. 1D illustrates a replication configuration selection technique 1D00 as implemented in systems for establishing and maintaining availability domain fault tolerance in highly dynamic distributed computing environments. As an option, one or more variations of replication configuration selection technique 1D00 or any aspect thereof may be implemented in the context of the architecture and functionality of the embodiments described herein. The replication configuration selection technique 1D00 or any aspect thereof may be implemented in any environment.

The replication configuration selection technique 1D00 presents one embodiment of certain steps and/or operations for establishing and maintaining availability domain fault tolerance in highly dynamic distributed computing environments according to the herein disclosed techniques. In one or more embodiments, the steps and underlying operations comprising the replication configuration selection technique 1D00 can be executed by a metadata allocation agent.

The replication configuration selection technique 1D00 can commence with detecting certain replication configuration events (e.g., a user event, an initial replication configuration determination event, node topology change event, etc.). Step 162 serves to collect configuration scoring objective functions (e.g., from any one or more data structures that comprise configuration scoring objective functions 161). Step 163 serves to then normalize the objective functions. Further details pertaining to objective functions, techniques for normalization, and uses of the foregoing are given in FIG. 6.

In some situations the event (e.g., adding hardware) may itself cause a topology change. As such, any objective functions that use any aspect of topology may further invoke an operation to receive of a set of node topology attributes that describe a set of nodes and their associated availability domains. Some of such operations can use the received node topology attributes and/or other information to score a particular replication configuration (e.g., according to a set of availability domain awareness and separation skew objectives, etc.). Scored replication configurations are ranked by their respective configuration scores (step 164). As earlier mentioned, the configuration score provides a quantitative measure of availability domain awareness and a quantitative measure of separation skew. Configurations that have higher separation skew values are deemed to be more change tolerant than configurations that have lower separation skew values since less data would need to be reapportioned and replicated. Skew values and impact on change tolerance is further discussed as pertains to FIG. 2 and FIG. 3.

Returning to the discussion of decision 166, if only a single one of the candidate replication configurations has a highest configuration score, that replication configuration is selected for implementation (step 169 after taking the "No" path of decision 166).

However, in some cases (as depicted by the "Yes" path of decision 166), two or more of the candidate replication configurations might exhibit the same highest score. In these cases, another objective is considered to select the replication configuration to be implemented (e.g., break the "tie"). In certain embodiments, a resource usage balancing (e.g., load balancing) objective is considered. Specifically, a resource usage balancing objective can be applied by collecting a set of resource usage data 127 for the availability domains pertaining to the subject replication configurations (step 172). For example, the subject replication configurations might comprise the aforementioned candidate replication configurations as having an equal highest score. A resource usage balance score is determined for the subject replication configurations (step 174). For example, the resource usage balance score for a given replication configuration might derive from a weighted sum of the ranges of various resource usage metrics (e.g., CPU utilization, storage utilization, network bandwidth utilization, etc.) across the availability domains. In this case, a lower resource usage balance score (e.g., lower set of range values) might indicate a more balanced set of resources. When the resource usage balance scores are determined, the replication configuration with the best (e.g., lowest) resource usage balance score is selected for implementation (step 176).

Figure 2:
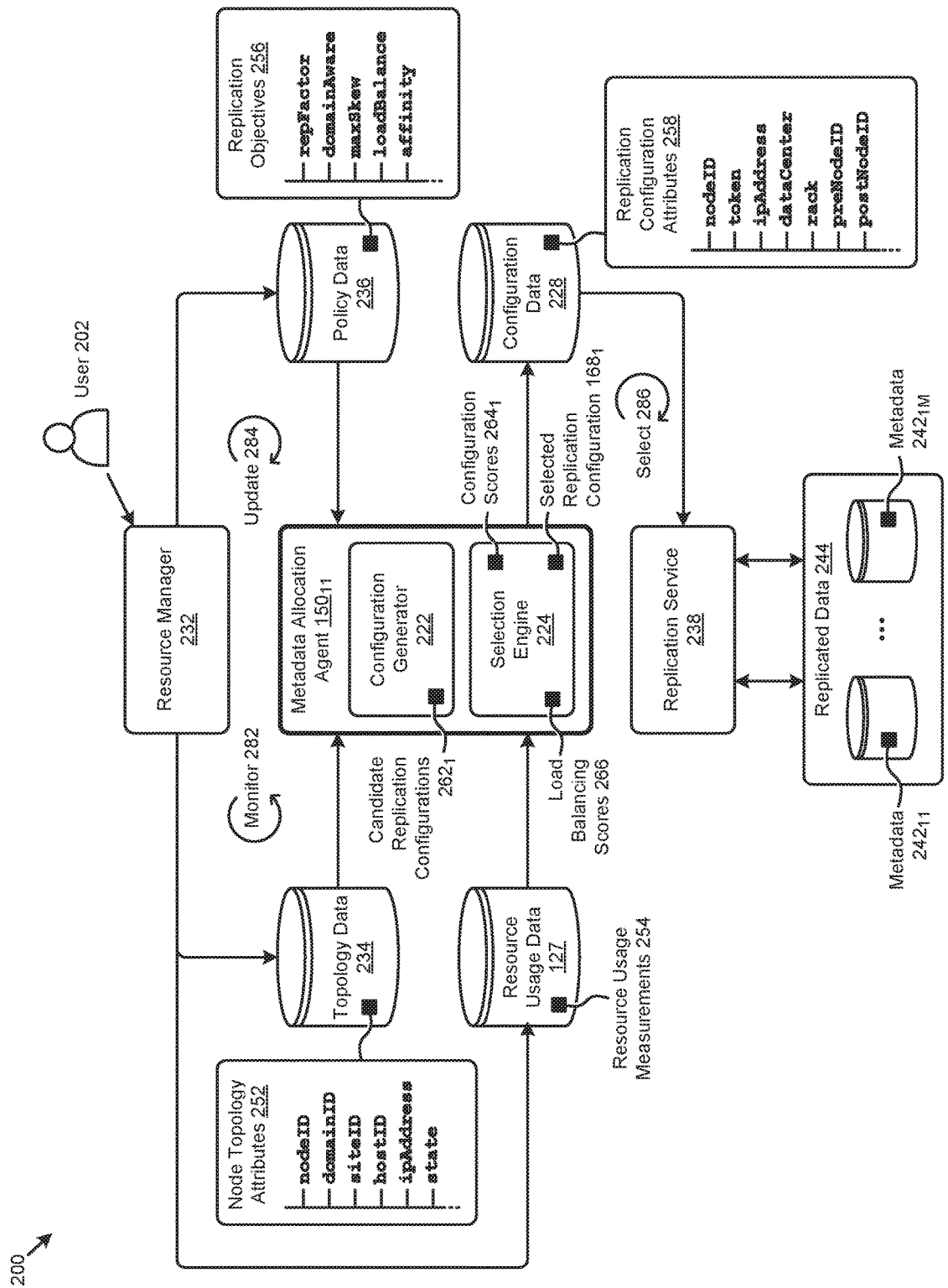
FIG. 2 depicts a computing environment that supports various techniques as used in systems for establishing and maintaining availability domain fault tolerance in highly dynamic distributed computing environments, according to an embodiment.

A computing environment for implementing any of the herein disclosed techniques is shown and described as pertains to FIG. 2.

FIG. 2 depicts a computing environment 200 that supports various techniques as used in systems for establishing and maintaining availability domain fault tolerance in highly dynamic distributed computing environments.

As shown in FIG. 2, the metadata allocation agent 150*ii* earlier described can interact with various components in a distributed computing environment to implement the herein disclosed techniques. Certain specialized data structures that are designed to improve the way a computer stores and retrieves data in memory when performing such techniques are also shown. Specifically, the metadata allocation agent $150_{11}$ might interact with various data provided by resource manager 232. In some cases, instances of the resource manager 232 might run on one or more nodes in a cluster with an elected leader instance. Resource manager 232 can provide certain instances of topology data 234 and/or instances of policy data 236 and/or instances of resource usage data 127 to the metadata allocation agent $150_{11}$.

Specifically, the resource manager 232 can continually monitor (at operation 282) the nodes in the cluster to detect changes to the node topology such as added nodes, removed nodes, failed nodes, and/or other node topology characteristics. In some cases, a "snitch" service can provide information about the node topology. The resource manager can further monitor the nodes in the clusters to collect various instances of resource usage measurements 254 at certain time intervals to indicate the historical resource usage (e.g., loading) across the cluster. In some cases, the resource usage measurements 254 can comprise predicted resource usage based in part on the historical resource usage and/or other data (e.g., planned workloads).

Information about the then-current node topology can be codified in the topology data 234. The topology data 234 are often organized and/or stored in a tabular structure (e.g., relational database table) having rows corresponding to a particular node and columns corresponding to various attributes pertaining to that node. For example, as depicted in the node topology attributes 252, a table row might describe a node identifier or "nodeID", an availability domain identifier or "domainID", a site identifier or "siteID", a host identifier or "hostID", an IP address or "ipAddress", a node state or "state" (e.g., pertaining to node health, loading, etc.), and/or other attributes.

Resource manager 232 can further continually update (at operation 284) policy data 236 based at least in part on user input (e.g., user 202), an enterprise policy file, and/or other policy data sources. Specifically, policy data 236 might store (e.g., in a relational database table) certain information pertaining to a set of replication objectives 256 derived from the foregoing policy information sources. As shown, the information pertaining to the replication objectives 256 might describe a replication objective (e.g., a numerical replication factor or "repFactor", etc.), an availability domain awareness objective (e.g., a Boolean "domainAware" setting, etc.), a node separation skew objective (e.g., a Boolean "maxskew" setting, etc.), a load balancing objective (e.g., a Boolean "loadBalance" setting, etc.), a node affinity objective (e.g., an "affinity" node list, etc.), and/or other objectives.

When a replication configuration event is detected, a configuration generator 222 at the metadata allocation agent $150_{11}$ can use any data (e.g., topology data 234, policy data 236, etc.) available to metadata allocation agent $150_{11}$ to generate one or more instances of candidate replication configurations $262_1$. Further details pertaining to techniques for generating the candidate replication configurations $262_1$ are described herein. A selection engine 224 at metadata allocation agent $150_{11}$ can select a replication configuration (e.g., selected replication configuration $168_1$) based on the information described by the replication objectives 256. Further details pertaining to techniques for selecting a replication configuration from the candidate replication configurations $262_1$ are also described herein.

In some cases, for example, the selection engine 224 might compute a set of configuration scores $264_1$ for the candidate replication configurations $262_1$ to facilitate comparison of the configurations in an objective space derived from at least some of the replication objectives 256. The selection engine 224 can further compute a set of load balancing scores 266 for some or all of the candidate replication configurations $262_1$ to facilitate comparison of such configurations in an objective space defined at least in part by a load balancing objective. For example, the load balancing scores 266 might be derived from the resource usage measurements 254 comprising the resource usage data 127.

The selected replication configuration $168_1$ selected by selection engine 224 can be stored in a set of configuration data 228 for access by a replication service 238. Specifically, replication service 238 might run on each node in a cluster to manage a set of replicated data 244 comprising, for example, replicated instances of metadata (e.g., metadata $242_{11}$, . . . , metadata $242_{1M}$). More specifically, the replication service 238 manages the replicated data 244 across the distributed computing system using the selected replication configuration (e.g., ring configuration). The configuration data 228 describing the selected replication configuration $168_1$ are often organized and/or stored in a tabular structure (e.g., relational database table) having rows corresponding to a particular node in the selected replication configuration $168_1$ and columns corresponding to various attributes pertaining to that node.

For example, as depicted in the replication configuration attributes 258, a table row might describe a node identifier or "nodeID", a token identifier or "token", an IP address or "ipAddress", a data center or "dataCenter", a rack identifier or "rack", a predecessor node identifier or "preNodeID", a successor node identifier or "postNodeID", and/or other attributes. As an example, the "token" attribute, the "preNodeID" attribute, and/or the "postNodeID" attribute might be used to determine a node relationship in a ring configuration. The selection engine 224 can continually select (at operation 286) a new instance of a selected replication configuration $168_1$ based at least in part on node topology changes (e.g., scaling, policy data changes) and/or other dynamic events.

The components, data structures, and data flows shown in FIG. 2 present merely one partitioning and associated data manipulation approach. The specific example shown is purely exemplary, and other subsystems and/or partitioning are reasonable. Further details describing techniques for generating instances of the candidate replication configurations $262_1$ and selecting instances of the selected replication configuration $168_1$ as implemented using such components, data structures, data flows, and/or partitionings are shown and described as pertaining to FIG. 3.

Figure 3:
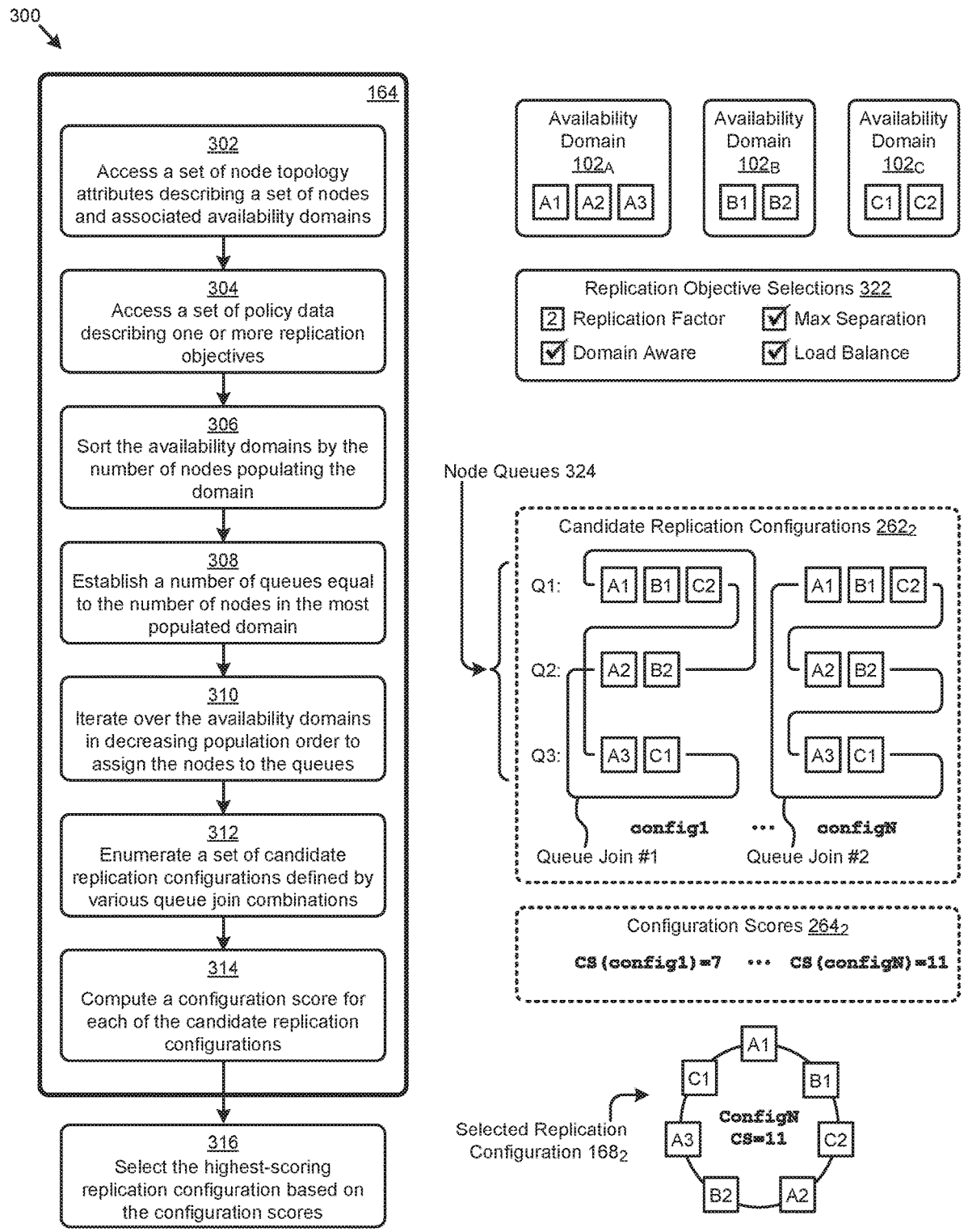
FIG. 3 presents a change tolerant replication configuration selection technique as implemented in systems for establishing and maintaining availability domain fault tolerance in highly dynamic distributed computing environments, according to an embodiment.

FIG. 3 presents a change tolerant replication configuration selection technique 300 as implemented in systems for establishing and maintaining availability domain fault tolerance in highly dynamic distributed computing environments. As an option, one or more variations of change tolerant replication configuration selection technique 300 or any aspect thereof may be implemented in the context of the architecture and functionality of the embodiments described herein. The change tolerant replication configuration selection technique 300 or any aspect thereof may be implemented in any environment.

The change tolerant replication configuration selection technique 300 presents one embodiment of certain steps and/or operations for generating and/or selecting replication configurations that are availability domain fault tolerant and/or node topology change tolerant according to the herein disclosed techniques. In one or more embodiments, the steps and underlying operations comprising the change tolerant replication configuration selection technique 300 can be executed by a metadata allocation agent as described herein. Certain illustrations corresponding to the steps and/or operations comprising the change tolerant replication configuration selection technique 300 are also shown for reference.

Specifically, change tolerant replication configuration selection technique 300 can commence by accessing a set of node topology attributes describing a set of nodes and associated availability domains (step 302). For example, as illustrated by the representative example, the node topology attributes might describe an availability domain $102_A$ comprising three nodes (e.g., node A1, node A2, and node A3), an availability domain $102_B$ comprising two nodes (e.g., node B1 and node B2), and an availability domain $102_C$ comprising two nodes (e.g., node C1 and node C2). A set of policy data describing one or more replication objectives is also accessed (step 304). As an example, the accessed policy data might comprise a set of replication objective selections 322 describing a replication factor of two (e.g., RF=2), an availability domain awareness objective selection, a maximized separation skew objective selection, and a load balancing objective selection.

Any of the aforementioned replication objective selections might have an associated value and/or an associated objective function 161. Moreover, a given objective function might include several variables that are used in evaluating candidate replication configurations. Such variables might need to be normalized. For example, a score pertaining to a load balancing objective might derive from a set of values that pertain to various resource usage metrics (e.g., CPU utilization, storage utilization, network bandwidth utilization, etc.). Resource usage metrics involving storage utilization might be expressed in gigabytes, while resource usage metrics involving of network utilization might be expressed in megabits/second. Any known techniques can be used to normalize by converting gigabytes to megabits (or by converting megabits to gigabytes), after which normalization has occurred, then objective functions involving both storage utilization and network utilization can be evaluated. As another example of normalization, a first portion of a topology might be expressed in terms of spatial relationships between computing nodes, whereas second portion of a topology might be expressed in terms of spatial relationships between computing racks. As such, any topological descriptions involving aspects of both the first portion and the second portion of the topological description are normalized to a common unit. In this example, a common unit might be nodes. In another case it might be some lowest-common unit, such as a CPU.

The availability domains described in the node topology attributes are sorted according to the number of nodes populating each availability domain (step 306). In this case, for example, availability domain $102_A$ having three nodes would be ranked ahead of availability domain $102_B$ and availability domain $102_C$, each of which availability domains has two nodes. A number of queues equal to the number of nodes in the most populated domain is established (step 308). As can be observed, there are three queues (e.g., node queues 324) since the value of three corresponds to the three nodes comprising the largest representative availability domain (e.g., availability domain $102_A$). These queues are then filled by iterating over the availability domains in decreasing population order and assigning their respective nodes in turn to each queue (step 310). For example, node A1 is assigned to queue Q1, node A2 is assigned to queue Q2, node A3 is assigned to queue Q3, node B1 is assigned to queue Q1, node B2 is assigned to queue Q2, and so on.

Candidate replication configurations are enumerated by joining the queues using various combinations of queue joins (step 312). As depicted in a representative set of candidate replication configurations 2622, instances of the node queues 324 are joined in various combinations to generate a set of N candidate replication configurations represented by a "config1" and a "configN". A configuration score (CS) for each of the candidate replication configurations is computed (step 314). The configuration scores 2642 shown in FIG. 3 indicate the configuration score (see EQ. 1) for candidate replication configuration "config1" is 7, and the configuration score for candidate replication configuration "configN" is 11. A replication configuration is then selected from the candidate replication configurations based on the configuration score (step 316). For example, the replication configuration (e.g., "configN") having the highest CS (e.g., "cs=11") can be selected (e.g., selected replication configuration 1682) to satisfy an availability domain awareness objective.

With respect to the aforementioned objectives, certain objectives can be quantified by use of an objective function. Strictly as an example, a load balancing objective function might be stated as "given two alternative nodes, each with its own corresponding resource loads, select the node that has the lowest CPU loading". Or, a load balancing objective function might be stated as "given two alternative nodes, each with its own corresponding resource loads, select the node that has the greatest amount of network bandwidth availability". The foregoing examples are merely for illustration. A load balancing objective function might be relatively more complicated than the foregoing examples, or a load balancing objective function might be relatively simpler than the foregoing. A load balancing objective function can be used for tie-breaking. In particular, two or more candidate replication configurations might have the same high configuration score. In this scenario, any of the candidate replication configurations having the high score might satisfy an availability domain awareness objective and/or a maximized separation skew objective. However, when a load balancing objective (e.g., as selected in replication objective selections 322) and/or other replication objectives are enforced, such objectives can be used to select a replication configuration from among the candidate replication configurations have the same high configuration score.

Any of the foregoing calculations can be performed by any operational unit of a metadata allocation agent. A particular partitioning of a metadata allocation agent is presented in FIG. 4A.

Figure 4A:
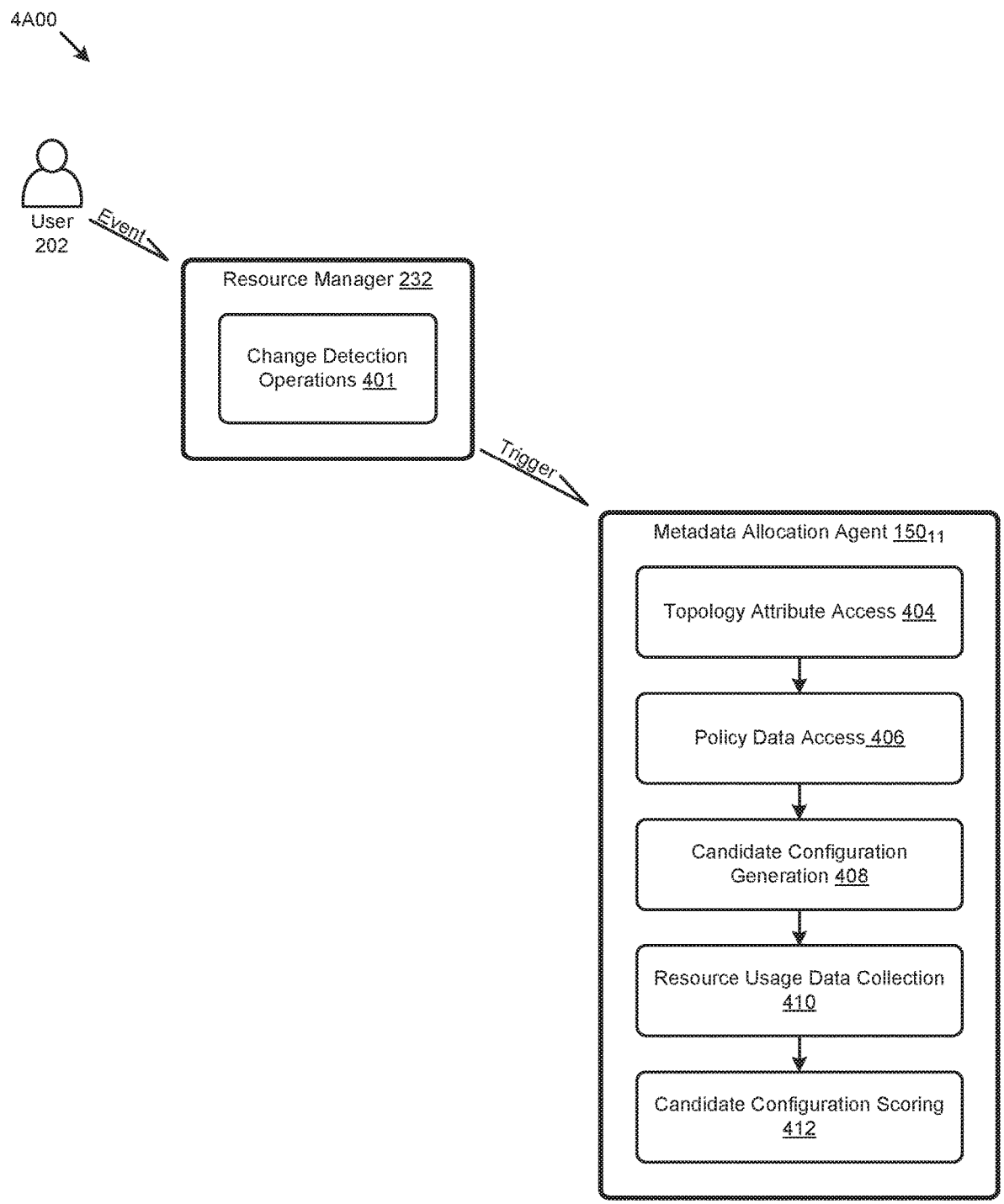
FIG. 4A depicts a partitioning of a metadata allocation agent as implemented in systems for establishing and maintaining availability domain fault tolerance in highly dynamic distributed computing environments, according to some embodiments.

FIG. 4A depicts a partitioning 4A00 of a metadata allocation agent as implemented in systems for establishing and maintaining availability domain fault tolerance in highly dynamic distributed computing environments. As an option, one or more variations of load balanced replication configuration selection techniques implemented by partitioning 4A00 may be implemented in the context of the architecture and functionality of the embodiments described herein. The partitioning 4A00 or any aspect thereof may be implemented in any environment.

A load balanced replication configuration selection technique is implemented within partitioning 4A00. The partitioning supports an ordered sequence of certain steps and/or operations for selecting a replication configuration based on a resource load balancing objective and/or other objectives according to the herein disclosed techniques. For example, selecting a replication configuration based on resource load balancing objectives might be implemented in cases for which the availability domain for certain subject nodes has yet to be defined. In one or more embodiments, the steps and underlying operations comprising the load balanced replication configuration selection technique can be executed by the metadata allocation agent $150_{11}$ described herein.

Specifically, the load balanced replication configuration selection technique can be triggered by any one or more change detection operations 401, such as detecting a change in node topology. For example, the subject nodes might be recently purchased nodes (e.g., for capacity expansion or scaling) and identified by the user 202, which recently purchased nodes have not been assigned to an availability domain. Such a detected change (e.g., resulting from a user's invocation of an initial replication configuration command) might trigger an existing instance or invoke and trigger a new instance of a metadata allocation agent $150_{11}$, which in turn invokes it constituent modules in an ordered sequence to access the then-current data and then act on it.

As shown the topology attribute access step 404 serves to access node topology attributes describing the then-current set of nodes (e.g., not including the subject nodes) and associated availability domains are accessed. Continuing, step 406 serves to access policy data describing the pertinent replication objectives. An indication that a particular load balancing objective is to be applied might be included in the accessed policy data. Further, the candidate configuration generation step 408 serves to generate a set of candidate replication configurations comprising the then-current nodes and the subject nodes that achieve the replication objectives.

In some cases, at least some the candidate replication configurations might be hypothetical since they might include nodes (e.g., subject nodes) that have not been deployed. When a set of load balancing objectives are to be applied (e.g., other objectives resulted in multiple feasible candidate replication configurations), a set of resource usage measurements for the availability domains of the candidate replication configurations are collected by the resource usage data collection steps 410. The collected resource usage measurements are used to determine a resource usage balance score for each of the replication configurations. The shown candidate configuration scoring steps 412 serve to calculate resource usage scores for a set of candidate replication configurations.

For example, a score might derive from a weighted sum of the ranges of various resource usage metrics (e.g., CPU utilization, storage utilization, network bandwidth utilization, etc.) across the availability domains in the candidate replication configuration. In some such cases, a lower resource usage balance score (e.g., lower set of range values) might indicate a more balanced set of resources. More specifically, assigning the subject nodes to a first availability domain to implement a first replication configuration might produce a resource usage that is more balanced (e.g., lower resource usage balance score) as compared to assigning the subject nodes to other availability domains as implemented in other replication configurations. When the resource usage balance scores are determined, the replication configuration with the best (e.g., lowest) resource usage balance score is selected for implementation.

Figure 4B:
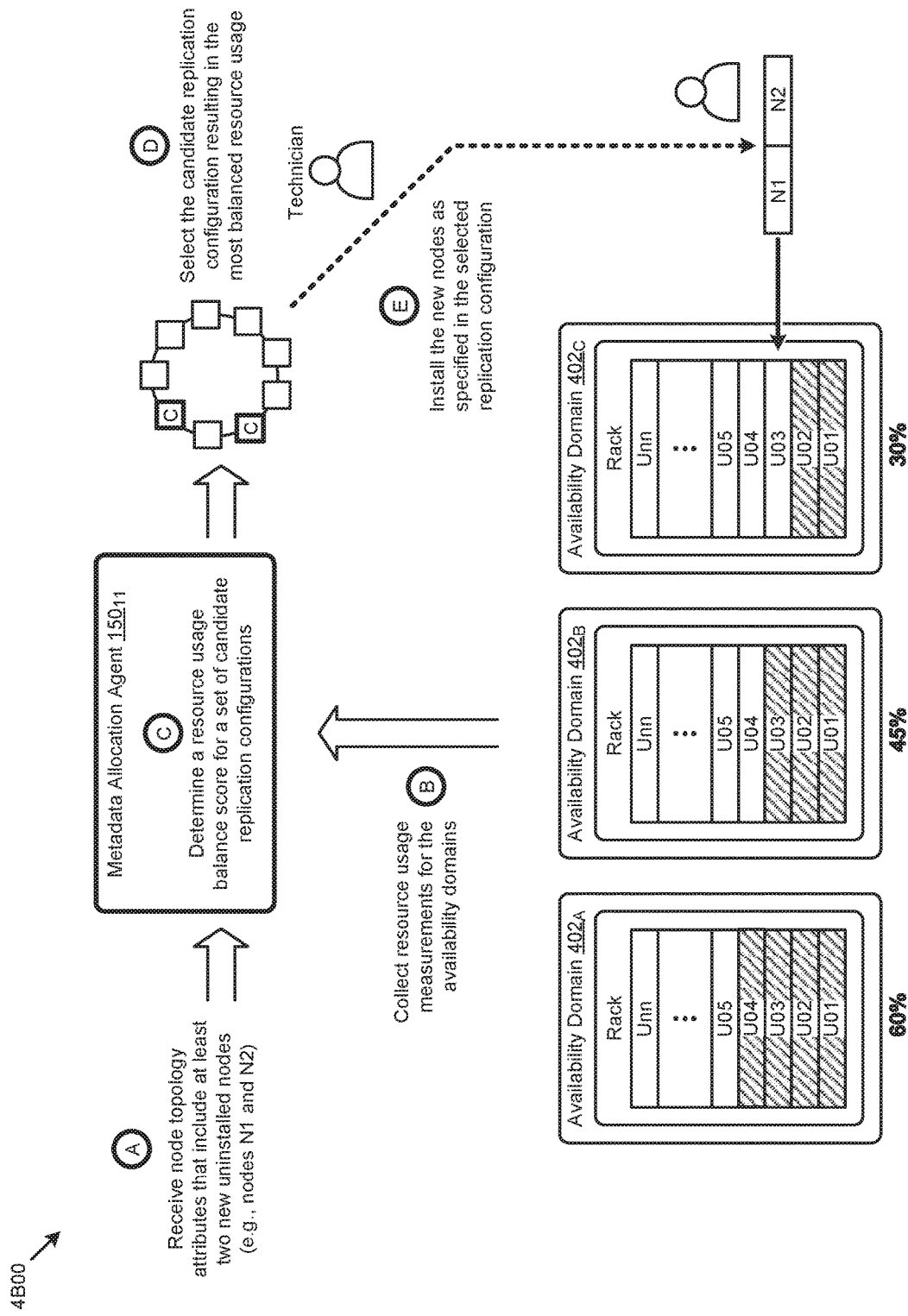
FIG. 4B illustrates a node deployment technique as implemented in systems for establishing and maintaining availability domain fault tolerance in highly dynamic distributed computing environments, according to an embodiment.

FIG. 4B presents one example of selecting and deploying a replication configuration as determined by a metadata allocation agent as implemented in accordance with the partitioning of FIG. 4A.

FIG. 4B illustrates a node deployment technique 4B00 as implemented in systems for establishing and maintaining availability domain fault tolerance in highly dynamic distributed computing environments. As an option, one or more variations of node deployment technique 4B00 or any aspect thereof may be implemented in the context of the architecture and functionality of the embodiments described herein. The node deployment technique 4B00 or any aspect thereof may be implemented in any environment.

As shown in the example implementation of the herein disclosed techniques presented in FIG. 4B, the metadata allocation agent $150_{11}$ receives a set of node topology attributes that include attributes pertaining to two new uninstalled nodes (operation A). For example, node N1 and node N2 might be procured by a system administrator based on an expected forthcoming demand for the additional resource capacity provided by the nodes.

To facilitate placement of the new nodes in a set of then-current availability domains, various resource usage measurements for the availability domains are collected at the metadata allocation agent $150_{11}$ (operation B). As can be observed, the availability domains (e.g., availability domain $402_A$, availability domain $402_B$, and availability domain $402_C$) might each be defined by a physical rack having "nn" slots of 1U height to receive, for example, 1U node appliances. As further shown, for example, the collected resource usage measurements might indicate that availability domain $402_A$ is operating at a 60% utilization, availability domain $402_B$ is operating at a 45% utilization, and availability domain $402_C$ is operating at a 30% utilization, where utilization might be defined by a weighted sum of various resource utilizations (e.g., CPU utilization, storage utilization, bandwidth utilization, storage I/O (input/output or IO) utilization, etc.).

Using the resource usage measurements and/or other information (e.g., replication policy data, objectives, etc.) a resource usage balance score for a set of candidate replication configurations is determined (operation C). The candidate replication configuration having the resource usage balance score that best achieves the resource usage balance is selected (operation D). The selected replication configuration is prepared for implementation, in part, by an installation of the new nodes at the availability domain specified in the selected replication configuration (operation E). As shown in FIG. 4B, for example, such installation might be performed by a technician who installs a 1U node appliance comprising node N1 and node N2 into slot "U03" of the rack in availability domain 402c.

Figure 5:
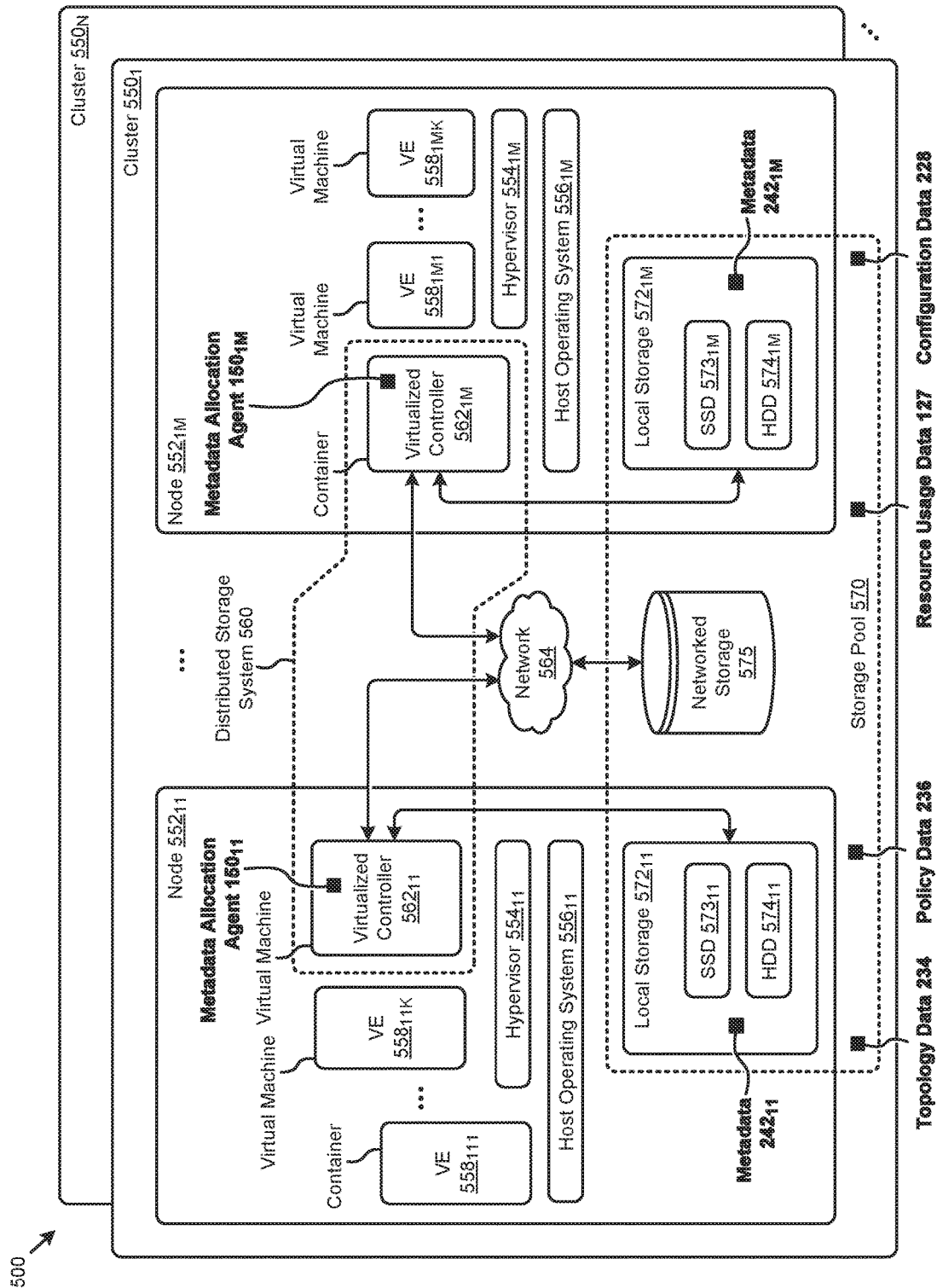
FIG. 5 depicts a system suited for implementing techniques to establish and maintain availability domain fault tolerance in highly dynamic distributed computing environments, according to some embodiments.

An example of a distributed computing environment (e.g., hyperconverged distributed computing environment) that supports any of the herein disclosed techniques is presented and discussed as pertains to FIG. 5.

FIG. 5 depicts a system 500 suited for implementing techniques to establish and maintain availability domain fault tolerance in highly dynamic distributed computing environments. As an option, one or more variations of system 500 or any aspect thereof may be implemented in the context of the architecture and functionality of the embodiments described herein. The system 500 or any aspect thereof may be implemented in any environment.

The shown distributed computing environment depicts various components associated with one instance of a distributed computing system (e.g., hyperconverged distributed system) comprising a distributed storage system 560 that can be used to implement the herein disclosed techniques. Specifically, the system 500 comprises multiple clusters (e.g., cluster $550_1$, ..., cluster $550_N$) comprising multiple nodes that have multiple tiers of storage in a storage pool. Representative nodes (e.g., node $552_{11}$, ..., node $552_{1M}$) and storage pool 570 associated with cluster $550_1$ are shown. Each node can be associated with one server, multiple servers, or portions of a server. The nodes can be associated (e.g., logically and/or physically) with the clusters. As shown, the multiple tiers of storage include storage that is accessible through a network 564, such as a networked storage 575 (e.g., a storage area network or SAN, network attached storage or NAS, etc.). The multiple tiers of storage further include instances of local storage (e.g., local storage $572_{11}$, ..., local storage $572_{1M}$). For example, the local storage can be within or directly attached to a server and/or appliance associated with the nodes. Such local storage can include solid state drives (SSD $573_{11}$, ..., SSD $573_{1M}$), hard disk drives (HDD $574_{11}$, ..., HDD $574_{1M}$), and/or other storage devices.

As shown, the nodes in system 500 can implement one or more user virtualized entities (e.g., VE $558_{111}$, VE $558_{11K}$, VE $558_{1M1}$, VE $558_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $556_{11}$, ..., host operating system $556_{1M}$), while the VMs run multiple applications on various respective guest operating systems. Such flexibility can be facilitated at least in part by a hypervisor (e.g., hypervisor $554_{11}$, ..., hypervisor $554_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $556_{11}$, ..., host operating system $556_{1M}$) without, in most cases, a hypervisor layer. This lightweight implementation can facilitate efficient distribution of certain software components, such as applications or services (e.g., micro-services). As shown, system 500 can implement both a hypervisor-assisted virtualization environment and a container virtualization environment for various purposes.

System 500 also comprises at least one instance of a virtualized controller to facilitate access to storage pool 570 by the VMs and/or containers and/or other virtualized entities.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 560 which can, among other operations, manage the storage pool 570. This architecture further facilitates efficient scaling of the distributed virtualization system. The foregoing virtualized controllers can be implemented in system 500 using various techniques. Specifically, an instance of a virtual machine at a given node can be used as a virtualized controller in a hypervisor-assisted virtualization environment to manage storage and I/O activities. In this case, for example, the virtualized entities at node $552_{11}$ can interface with a controller virtual machine (e.g., virtualized controller $562_{11}$) through hypervisor $554_{11}$ to access the storage pool 570. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 560.

For example, a hypervisor at one node in the distributed storage system 560 might correspond to VMware ESXi software, and a hypervisor at another node in the distributed storage system 560 might correspond to Nutanix AHV software. As another virtualized controller implementation example, containers (e.g., Docker containers) can be used to implement a virtualized controller (e.g., virtualized controller $562_{1M}$) in an operating system virtualization environment at a given node. In this case, for example, the virtualized entities at node $552_{1M}$ can access the storage pool 570 by interfacing with a controller container (e.g., virtualized controller $562_{1M}$) through hypervisor $554_{1M}$ and/or the kernel of host operating system $556_{1M}$.

In certain embodiments, one or more instances of a metadata allocation agent can be implemented in system 500 to facilitate the herein disclosed techniques. Specifically, and as shown, metadata allocation agent $150_{11}$ can be implemented in virtualized controller $562_{11}$ at node $552_{11}$, and metadata allocation agent $150_{1M}$ can be implemented in virtualized controller $562_{1M}$ at node $552_{1M}$. Such instances of the metadata allocation agent and/or virtualized controller can be implemented in any node in any cluster. Actions taken by one or more instances of the metadata allocation agent and/or virtualized controller can apply to a node (or between nodes), and/or to a cluster (or between clusters), and/or between any resources or subsystems or processing environments accessible by the virtualized controller or their agents (e.g., metadata allocation agent). Also, any of the foregoing virtualized entities and/or nodes can host instances of the earlier described resource manager, replication service, and/or other components and/or agents.

As can be observed, the datastores associated with the herein disclosed techniques can be stored in various storage facilities in the storage pool 570. As an example, various instances of the topology data 234, policy data 236, resource usage data 127, and configuration data 228 might be distributed across the storage pool 570 to facilitate reliable access by various instances of the metadata allocation agent and/or the virtualized controller. As further shown, the replication configurations established and maintained according to the herein disclosed techniques can facilitate replication of certain metadata (e.g., metadata $242_{11}$, metadata $242_{1M}$) across the nodes in the cluster.

Additional Embodiments of the Disclosure

Additional Practical Application Examples

Figure 6:
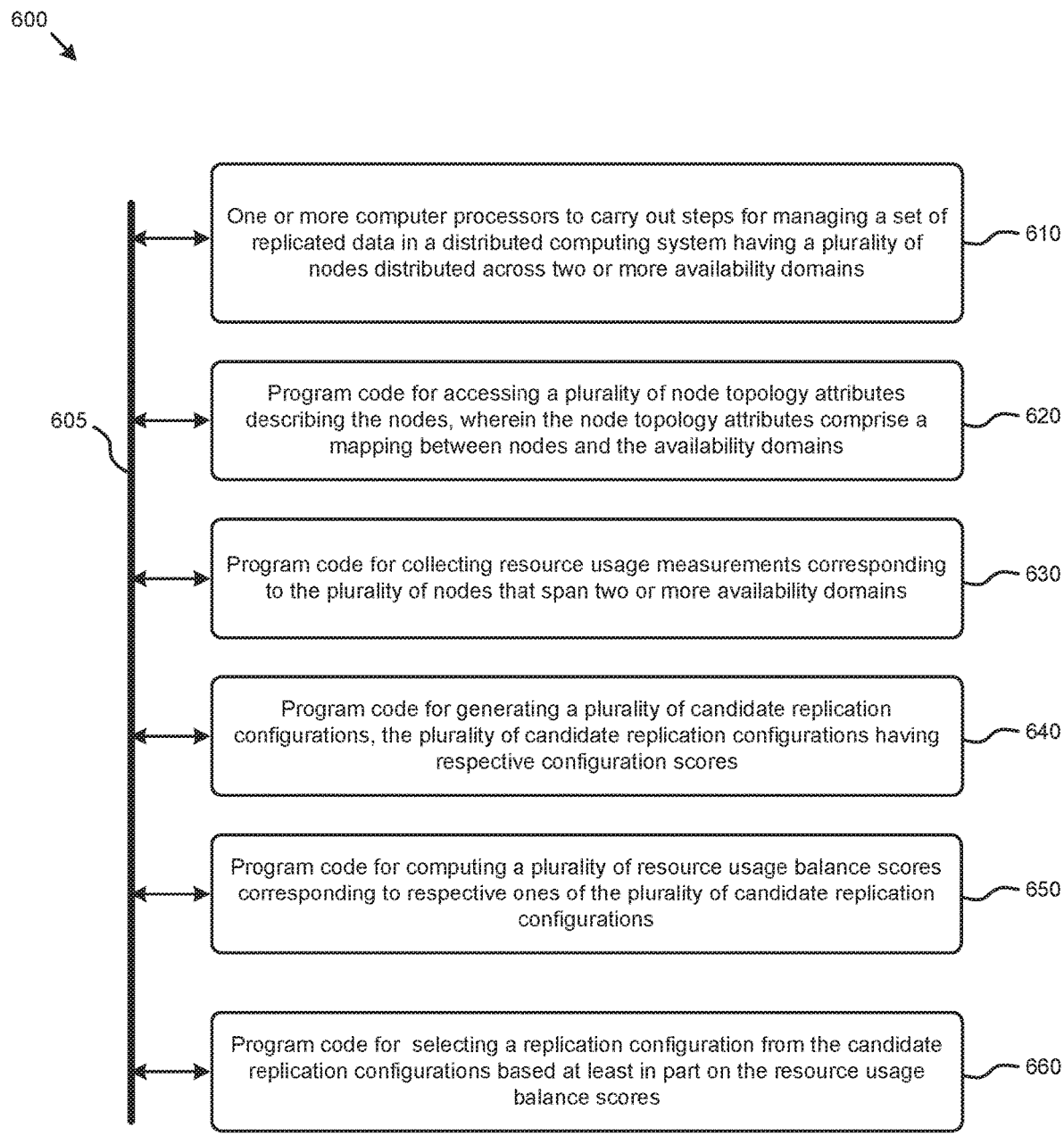
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address selecting efficient fault tolerant replication configurations that are compliant with service level policies in highly dynamic distributed computing systems. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform: accessing a plurality of node topology attributes describing the nodes, wherein the node topology attributes comprise a mapping between nodes and the availability domains (module 620); collecting resource usage measurements corresponding to the plurality of nodes that span two or more availability domains (module 630); generating a plurality of candidate replication configurations, the plurality of candidate replication configurations having respective configuration scores (module 640); computing a plurality of resource usage balance scores corresponding to respective ones of the plurality of candidate replication configurations (module 650); and selecting a replication configuration from the candidate replication configurations based at least in part on the resource usage balance scores (module 660).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 7A:
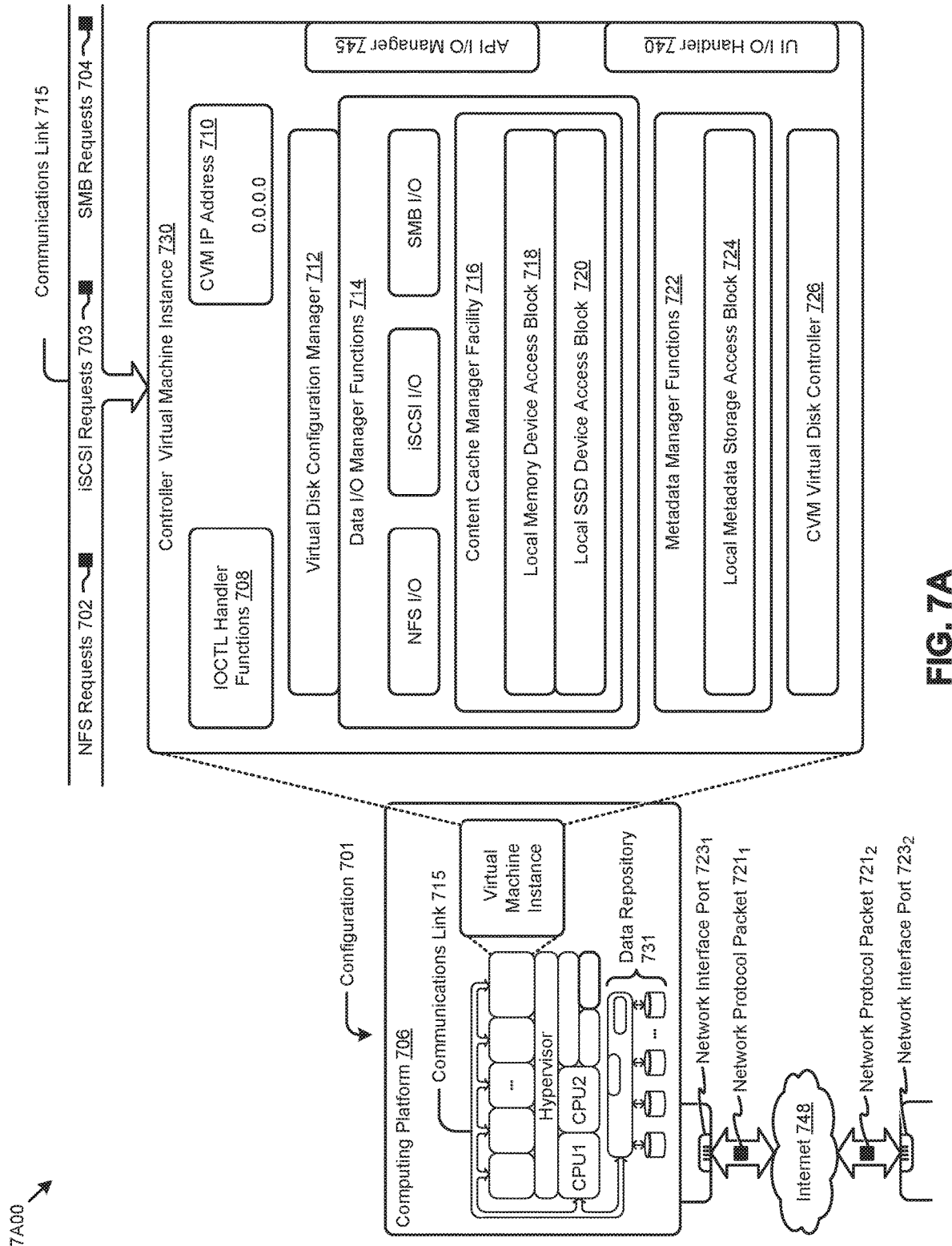
FIG. 7A and FIG. 7B depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 7A00 comprises a collection of interconnected components suitable for implementing embodiments of the present disclosure and/or for use in the herein-described environments. Moreover, the shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS IO, iSCSI IO, SMB TO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to establishing and maintaining availability domain fault tolerance in highly dynamic distributed computing environments. In some embodiments, a module may include one or more state machines and/or combinational logic used to implement or facilitate the operational and/or performance characteristics pertaining to establishing and maintaining availability domain fault tolerance in highly dynamic distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of establishing and maintaining availability domain fault tolerance in highly dynamic distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to establishing and maintaining availability domain fault tolerance in highly dynamic distributed computing environments, and/or for improving the way data is manipulated when performing computerized operations pertaining to implementing a multi-objective selection technique to select from a set of candidate availability domain-aware replication configurations.

Figure 7B:
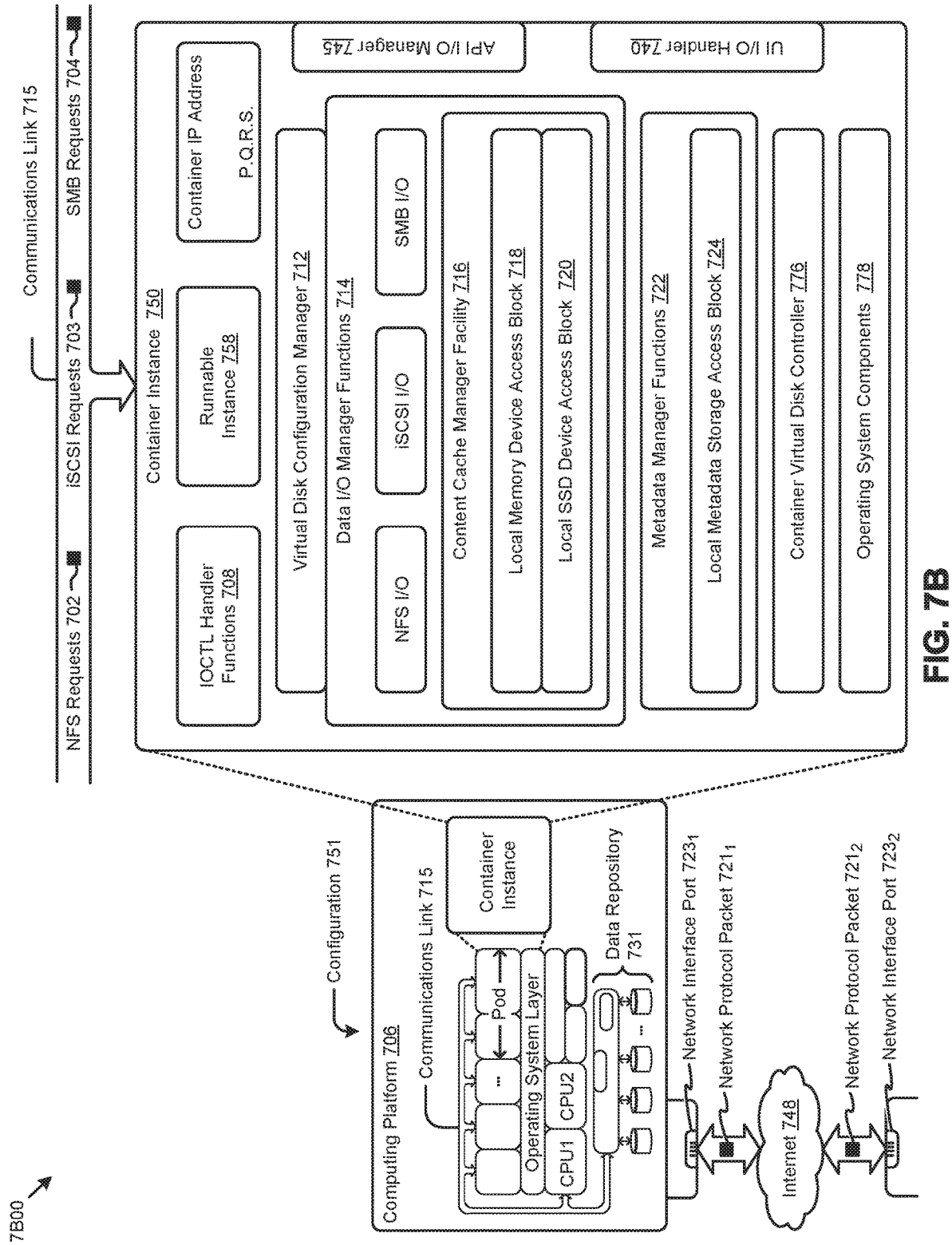

FIG. 7B depicts a virtualized controller implemented by a containerized architecture 7B00. The containerized architecture comprises a collection of interconnected components suitable for implementing embodiments of the present disclosure and/or for use in the herein-described environments. Moreover, the shown containerized architecture 7B00 includes a container instance in a configuration 751 that is further described as pertaining to the container instance 750. The configuration 751 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls–a", etc.). The container might optionally include operating system components 778, however such a separate set of operating system components need not be provided. As an alternative, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    accessing an attribute describing a topology of a virtualization environment, wherein the virtualization environment comprises a first node and a second node that belong respectively to a first availability domain and a second availability domain, and the attribute comprises a mapping between a node and an availability domain in the virtualization environment;
    collecting resource usage corresponding to the first and the second nodes;
    generating multiple candidate replication configurations and a resource usage balance score for each of the multiple candidate replication configurations based on at least in part upon the mapping and the resource usage; and
    selecting a replication configuration from the multiple candidate replication configurations based at least in part on the resource usage balance score.

2. The method of claim 1, wherein the resource usage balance score is computed for a candidate replication configuration and describes a quantitative relationship with a resource usage objective.

3. The method of claim 1, further comprising:
    deploying a subject node at a subject availability domain, wherein the subject node is identified from the first or the second node, and the subject availability domain is identified from the first or the second availability domain comprising the replication configuration.

4. The method of claim 1, wherein the attribute is accessed responsive to a configuration event.

5. The method of claim 4, wherein the configuration event is triggered by at least one of an initial replication configuration command or a node topology change.

6. The method of claim 1, wherein a configuration score is determined for a candidate replication configuration and describes a quantitative relationship with at least one of a replication factor value, an availability domain aware objective, or a separation skew objective.

7. The method of claim 1, wherein a configuration score corresponding to a candidate replication configuration is determined based at least in part on a count of a set of intervening nodes between a pair of nodes.

8. The method of claim 1, wherein the attribute comprises at least one of a node identifier, an availability domain identifier, a site identifier, a host identifier, an IP address, or a node state.

9. The method of claim 1, wherein the replication configuration is described by at least one of a node identifier, a token identifier, an IP address, a data center, a rack identifier, a predecessor node identifier, or a successor node identifier.

10. The method of claim 1, wherein the first or the second availability domain corresponds to at least a respective one of the node, a block, a host, a site, an appliance, a rack, or a data center.

11. The method of claim 1, wherein at least one of the multiple candidate replication configurations describe a respective logical arrangement of the first and the second nodes as a ring organization.

12. The method of claim 1, further comprising performing a comparison between a configuration score and a configuration score threshold, wherein the configuration score is determined for a candidate replication configuration of the multiple candidate replication configurations.

13. The method of claim 12, wherein the configuration score for the each of the multiple candidate replication configurations surpasses the configuration score threshold.

14. The method of claim 13, wherein the replication configuration is selected from the candidate replication configurations based at least in part on a separation skew value, rather than considering the configuration score for the candidate replication configuration.

15. The method of claim 13, wherein the replication configuration is selected from the candidate replication configurations based at least in part on the resource usage balance score, rather than selecting based on the configuration score.

16. A non-transitory computer readable medium having stored thereon a sequence of instructions which, when stored in memory and executed by a processor, causes the processor to perform a set of acts, the set of acts comprising:
    accessing an attribute describing a topology of a virtualization environment, wherein the virtualization environment comprises a first node and a second node that belong respectively to a first availability domain and a second availability domain, and the attribute comprises a mapping between a node and an availability domain in the virtualization environment;
    collecting resource usage corresponding to the first and the second nodes;
    generating multiple candidate replication configurations and a resource usage balance score for each of the multiple candidate replication configurations based at least in part upon the mapping and the resource usage; and
    selecting a replication configuration from the multiple candidate replication configurations based at least in part on the resource usage balance score.

17. The non-transitory computer readable medium of claim 16, wherein the resource usage balance score is computed for a candidate replication configuration and describes a quantitative relationship with a resource usage objective.

18. The non-transitory computer readable medium of claim 16, further comprising instructions which, when stored in the memory and executed by the processor, causes the processor to perform an act of:

deploying a subject node at a subject availability domain, wherein the subject node is identified from the first or the second node, and the subject availability domain is identified from the first or the second availability domain comprising the replication configuration.

19. The non-transitory computer readable medium of claim 16, further comprising instructions which, when stored in the memory and executed by the processor, causes the processor to perform an act of:

determining a third node from the first availability domain for the first node based at least in part upon a topological distance based at least in part upon a configuration score of the replication configuration.

20. The non-transitory computer readable medium of claim 16, wherein the replication configuration is selected based at least in part upon a configuration score for the replication configuration, and the configuration score is determined for the replication configuration based at least in part a first node score that corresponds to the first node in the first availability domain and a separate node in the first availability domain.

21. A system comprising:

a non-transitory storage medium having stored thereon a sequence of instructions; and a processor that executes the sequence of instructions to cause the one or more processors to perform a set of acts, the acts comprising, accessing an attribute describing a topology of a virtualization environment, wherein the virtualization environment comprises a first node and a second node that belong respectively to a first availability domain and a second availability domain, and the attribute comprises a mapping between a node and an availability domain in the virtualization environment;

collecting resource usage corresponding to the first and the second nodes;

generating multiple candidate replication configurations and a resource usage balance score for each of the multiple candidate replication configurations based at least in part upon the mapping and the resource usage; and selecting a replication configuration from the multiple candidate replication configurations based at least in part on the resource usage balance score.

22. The system of claim 21, wherein the resource usage balance score describes a quantitative relationship with a resource usage objective.

* * * * *